US007821994B2

(12) United States Patent
Sherman et al.

(10) Patent No.: US 7,821,994 B2
(45) Date of Patent: Oct. 26, 2010

(54) SUPPORTING MOBILE AD-HOC NETWORK (MANET) AND POINT TO MULTI-POINT (PMP) COMMUNICATIONS AMONG NODES IN A WIRELESS NETWORK

(75) Inventors: Matthew J. Sherman, Succasunna, NJ (US); Keith Conner, Booton, NJ (US); Kevin McNeill, Alexandria, VA (US); Timothy McNevin, Reston, VA (US)

(73) Assignee: BAE Systems Information And Electronic Systems Integration Inc., Nashua, NH (US)

( * ) Notice: Subject to any disclaimer, the term of this patent is extended or adjusted under 35 U.S.C. 154(b) by 85 days.

(21) Appl. No.: 11/991,030

(22) PCT Filed: Jun. 20, 2007

(86) PCT No.: PCT/US2007/014386

§ 371 (c)(1),
(2), (4) Date: Mar. 12, 2009

(87) PCT Pub. No.: WO2008/002436

PCT Pub. Date: Jan. 3, 2008

(65) Prior Publication Data

US 2009/0201860 A1    Aug. 13, 2009

Related U.S. Application Data

(60) Provisional application No. 60/816,038, filed on Jun. 23, 2006.

(51) Int. Cl.
*H04W 84/00* (2009.01)

(52) U.S. Cl. .......................................... 370/329; 455/7

(58) Field of Classification Search ................. 370/469, 370/338, 311, 328, 503, 412, 254, 474, 208; 455/454, 7, 562, 450, 78, 423
See application file for complete search history.

(56) References Cited

U.S. PATENT DOCUMENTS 6,738,619 B1 * 5/2004 Yabuta et al. ............... 455/423

(Continued)

OTHER PUBLICATIONS

C. D. Young, USAP Multiple Broadcast Access: Transmitter- and Receiver-Directed Dynamic Resource Allocation for Mobile, Multihop, Multichannel, Wireless Networking, IEEE MILCOM (2000) at pp. 549-553.

(Continued)

*Primary Examiner*—Thong H Vu
(74) *Attorney, Agent, or Firm*—Daniel J. Long; Leo Zucker

(57) ABSTRACT

Member nodes of a wireless point-to-multipoint (PMP) network may participate in mobile ad hoc (MANET) or mesh communications with other nodes on the same channels used by the network for PMP communications. A PMP network base station node transmits a downlink signal defining a downlink map for scheduling first time periods for transmitting messages to subscriber station nodes, and an uplink map for scheduling second time periods allowing a subscriber station node to transmit messages to the base station node in a scheduled second time period. A MANET/mesh zone is allocated in either or both the downlink and the uplink maps, each zone operating to reserve one or more time slots and channels in which the base station and other nodes may communicate using a MANET/mesh protocol, thus avoiding interference with communications that are being conducted between the base and the subscriber station nodes under the PMP protocol.

11 Claims, 17 Drawing Sheets

U.S. PATENT DOCUMENTS

| | | | |
|---|---|---|---|
| 6,970,682 B2* | 11/2005 | Crilly et al. | 455/78 |
| 7,031,274 B2 | 4/2006 | Sherman | |
| 7,133,381 B2 | 11/2006 | Sherman | |
| 7,333,514 B2* | 2/2008 | Anehem et al. | 370/474 |
| 7,433,332 B2* | 10/2008 | Golden et al. | 370/328 |
| 7,466,985 B1* | 12/2008 | Handforth et al. | 455/454 |
| 7,570,921 B2* | 8/2009 | Sugar et al. | 455/63.4 |
| 7,599,341 B2* | 10/2009 | Ramachandran | 370/338 |
| 7,623,443 B2* | 11/2009 | Johnston | 370/208 |
| 7,630,402 B2* | 12/2009 | Un et al. | 370/469 |
| 7,630,406 B2* | 12/2009 | Sood et al. | 370/503 |
| 2002/0027894 A1 | 3/2002 | Arrakoski et al. | |
| 2003/0031208 A1* | 2/2003 | Anehem et al. | 370/474 |
| 2003/0053469 A1* | 3/2003 | Wentink | 370/412 |
| 2005/0174950 A1* | 8/2005 | Ayyagari | 370/254 |
| 2006/0046643 A1* | 3/2006 | Izumikawa et al. | 455/7 |
| 2006/0083205 A1 | 4/2006 | Buddhikot et al. | |
| 2006/0253736 A1* | 11/2006 | Rudolf et al. | 714/12 |
| 2007/0082674 A1* | 4/2007 | Pedersen et al. | 455/450 |
| 2007/0177627 A1* | 8/2007 | Raju et al. | 370/469 |
| 2007/0225044 A1* | 9/2007 | Law et al. | 455/562.1 |
| 2008/0002652 A1* | 1/2008 | Gupta et al. | 370/338 |
| 2008/0151802 A1* | 6/2008 | Sheu et al. | 370/311 |

OTHER PUBLICATIONS

J. P. Hauser, et al., Mobility and Routing Protocols for 802.11 Extended Service Sets, IEEE MILCOM (2003).

R. J. Hall, et al., A Tiered Geocast Protocol for Long Range Mobile Ad Hoc Networking, IEEE MILCOM (2006).

* cited by examiner

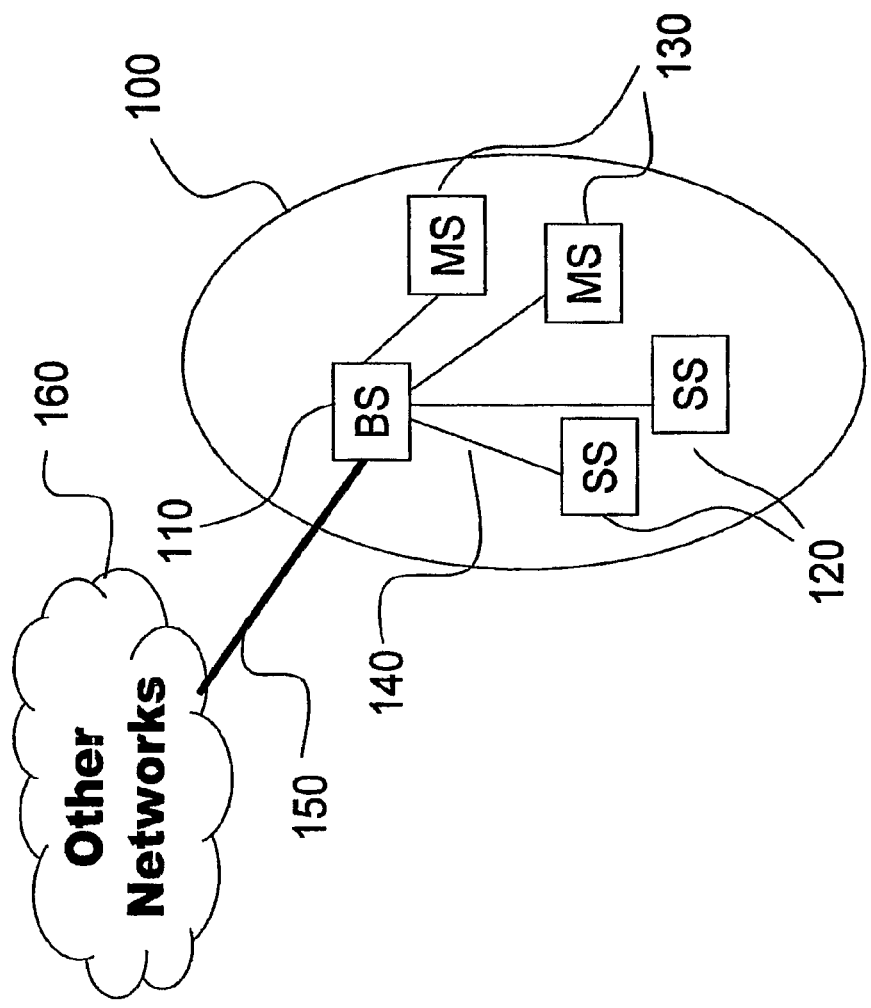
FIG. 1) PMP Topology

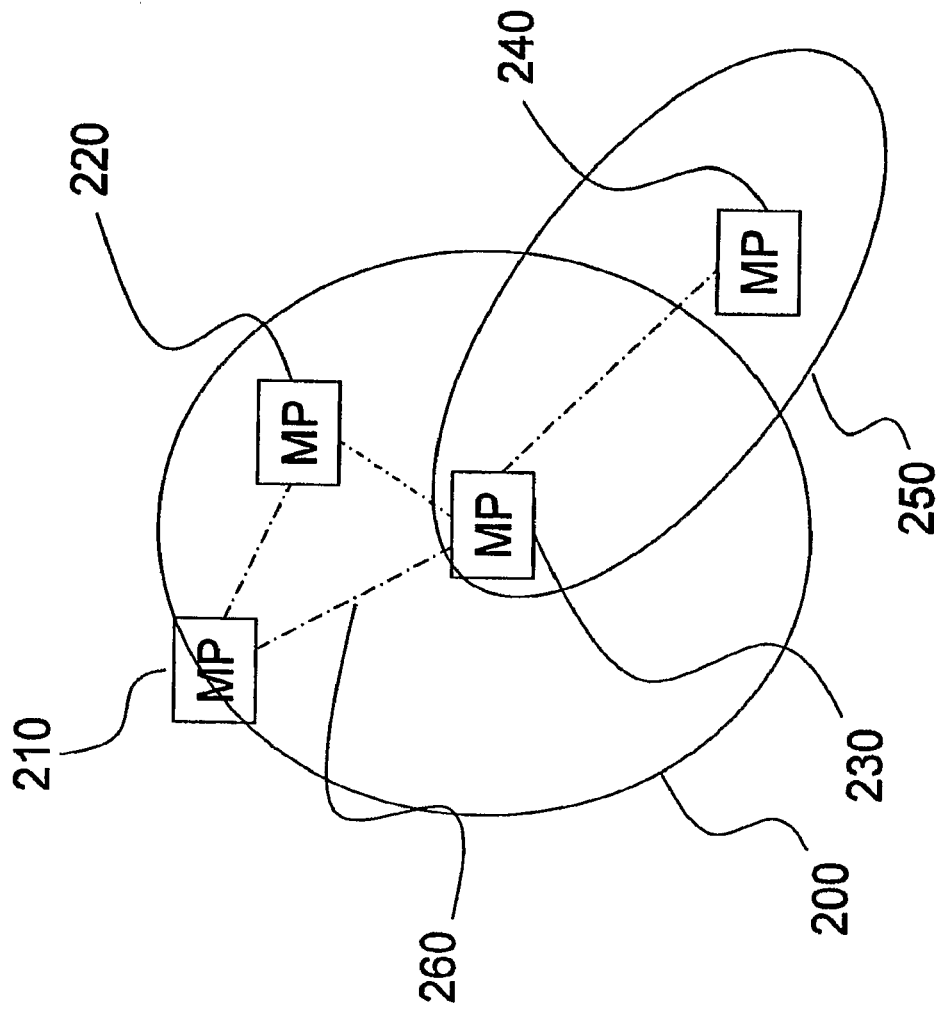
FIG. 2) MANET Topology

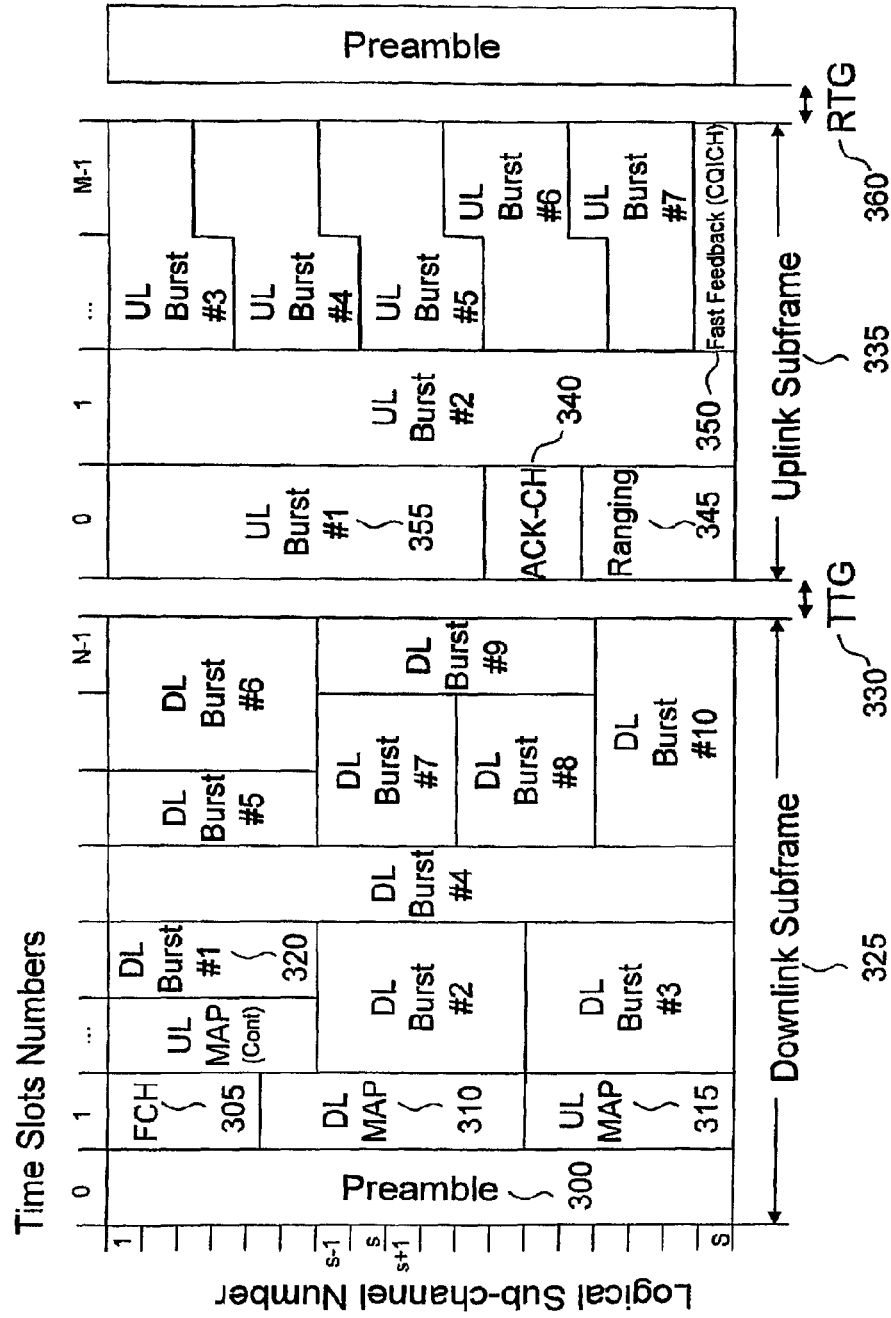
FIG. 3) PMP Frame

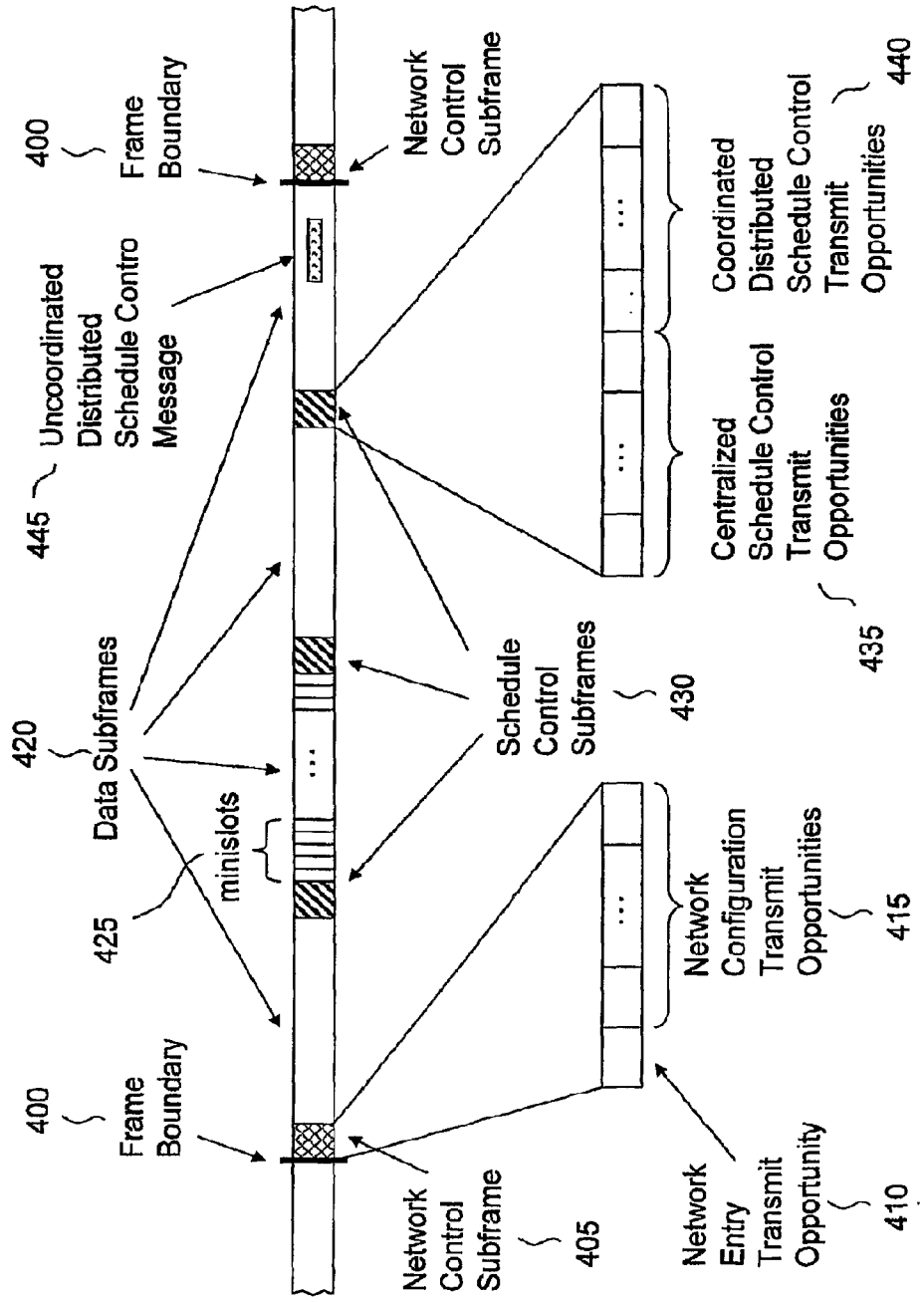
FIG. 4) 802.16d based Mesh Frame Structure

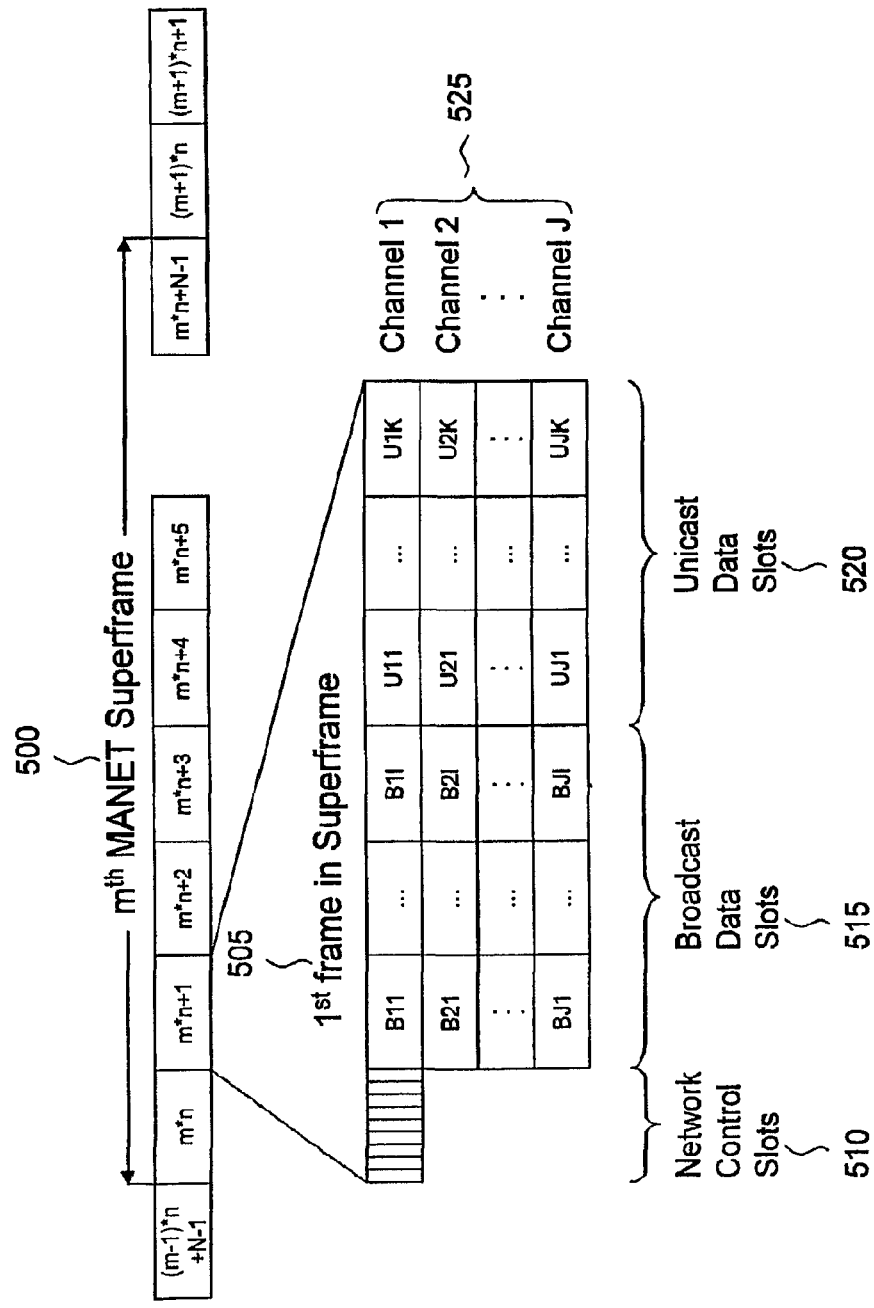
FIG. 5) USAP based MANET Frame Structure

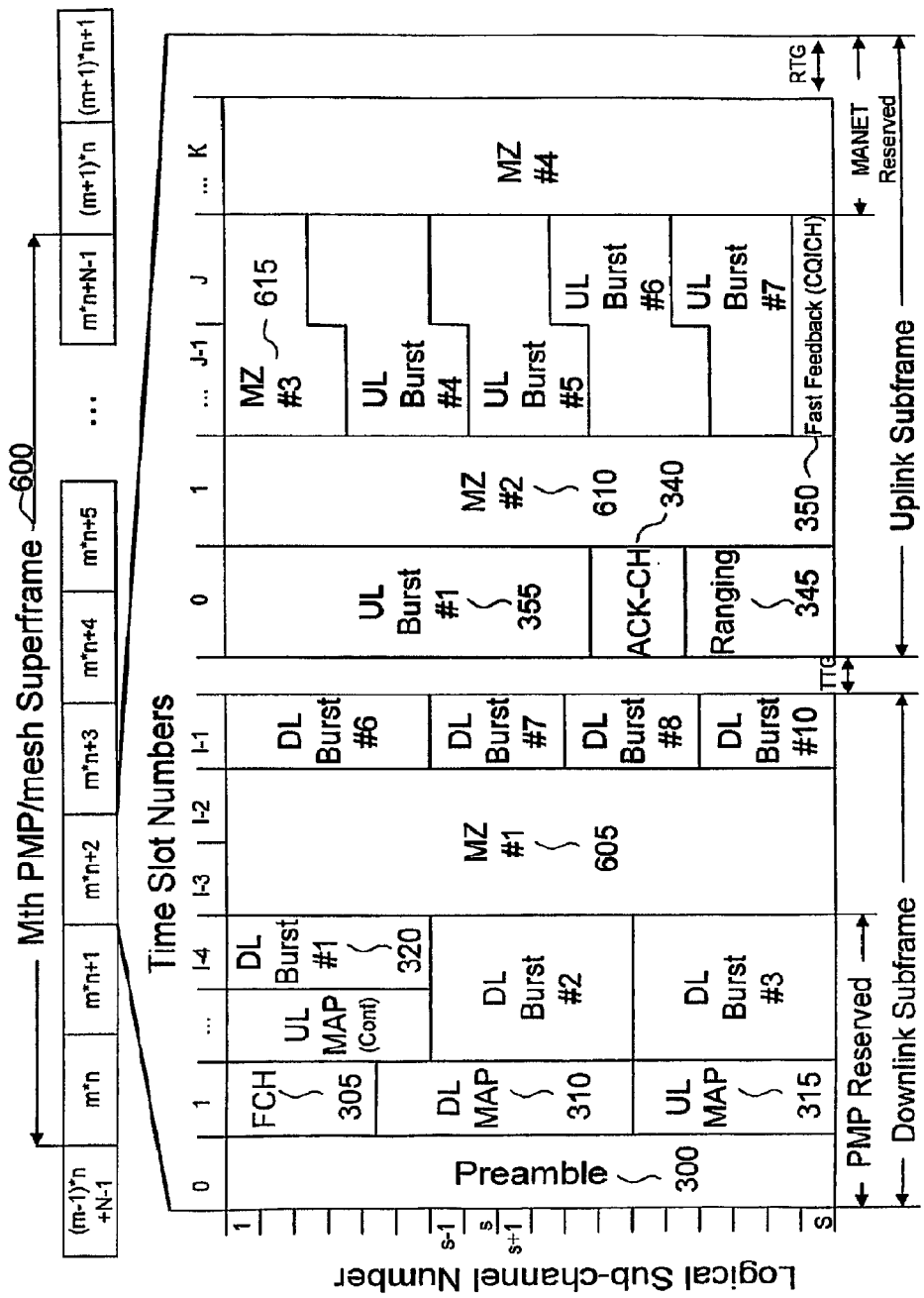
FIG. 6) PMP Frame Structure with MANET Zones

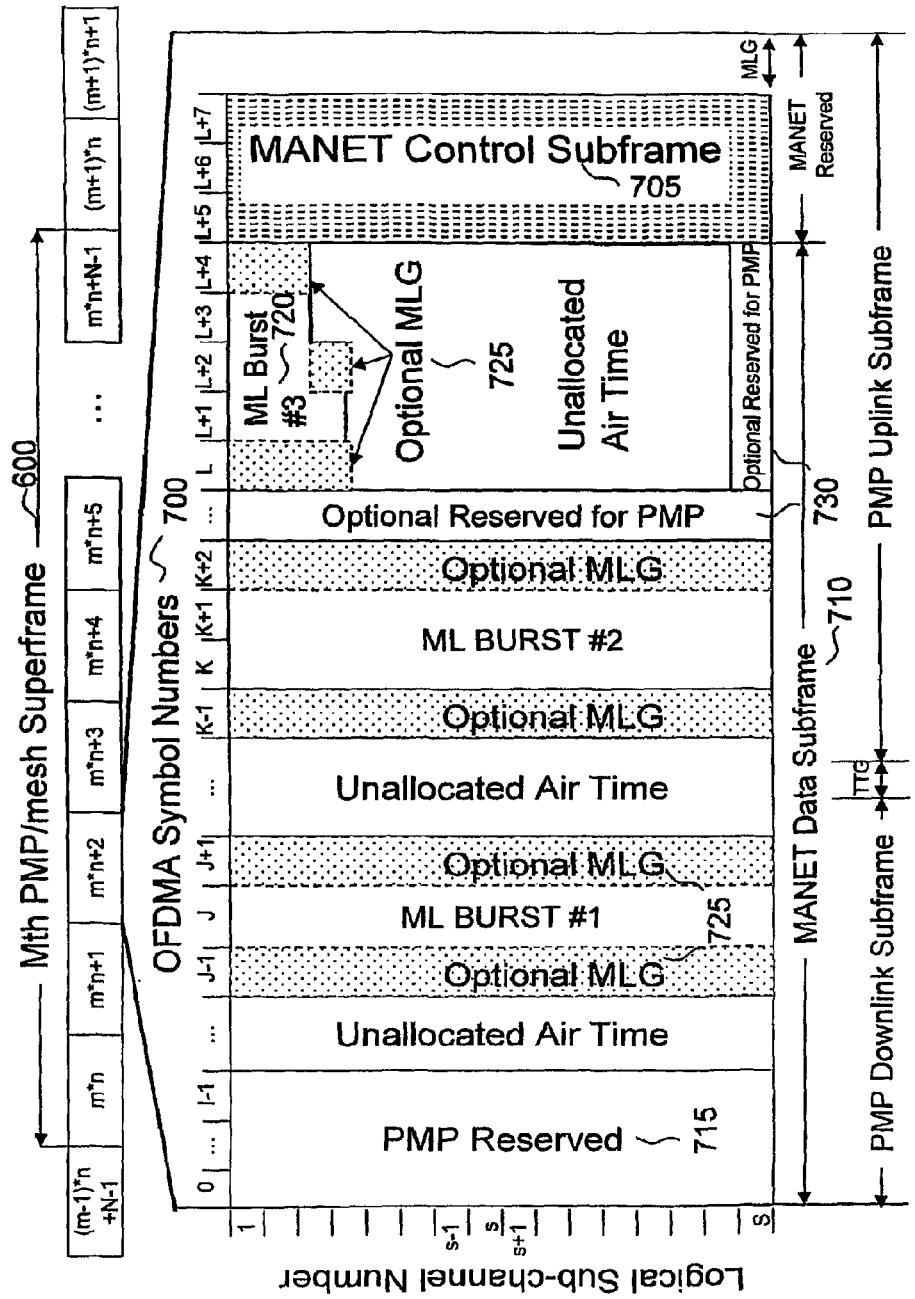
FIG. 7) PMP Compatible MANET Frame Structure

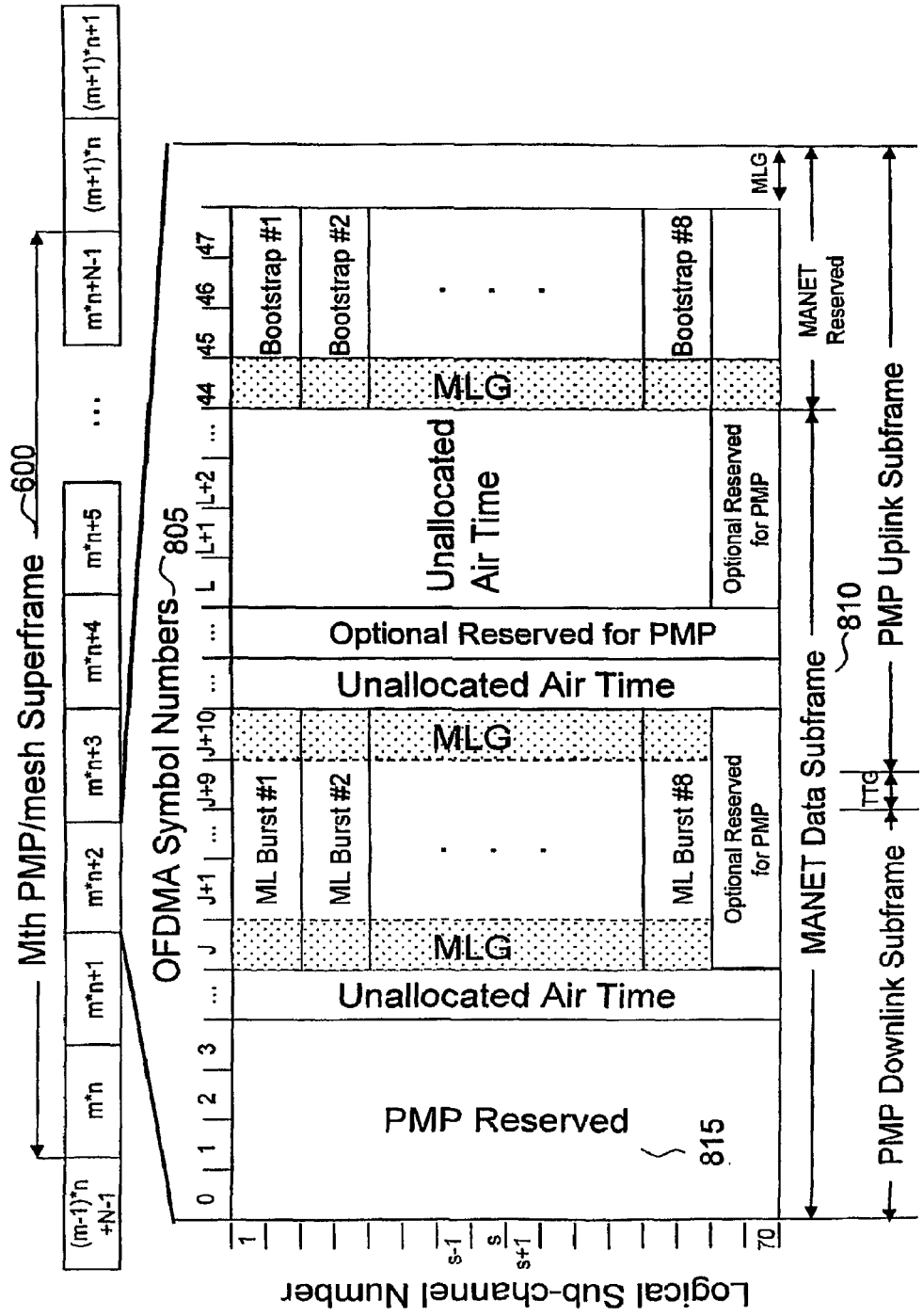
FIG. 8) PMP Compatible USAP Frame Structure

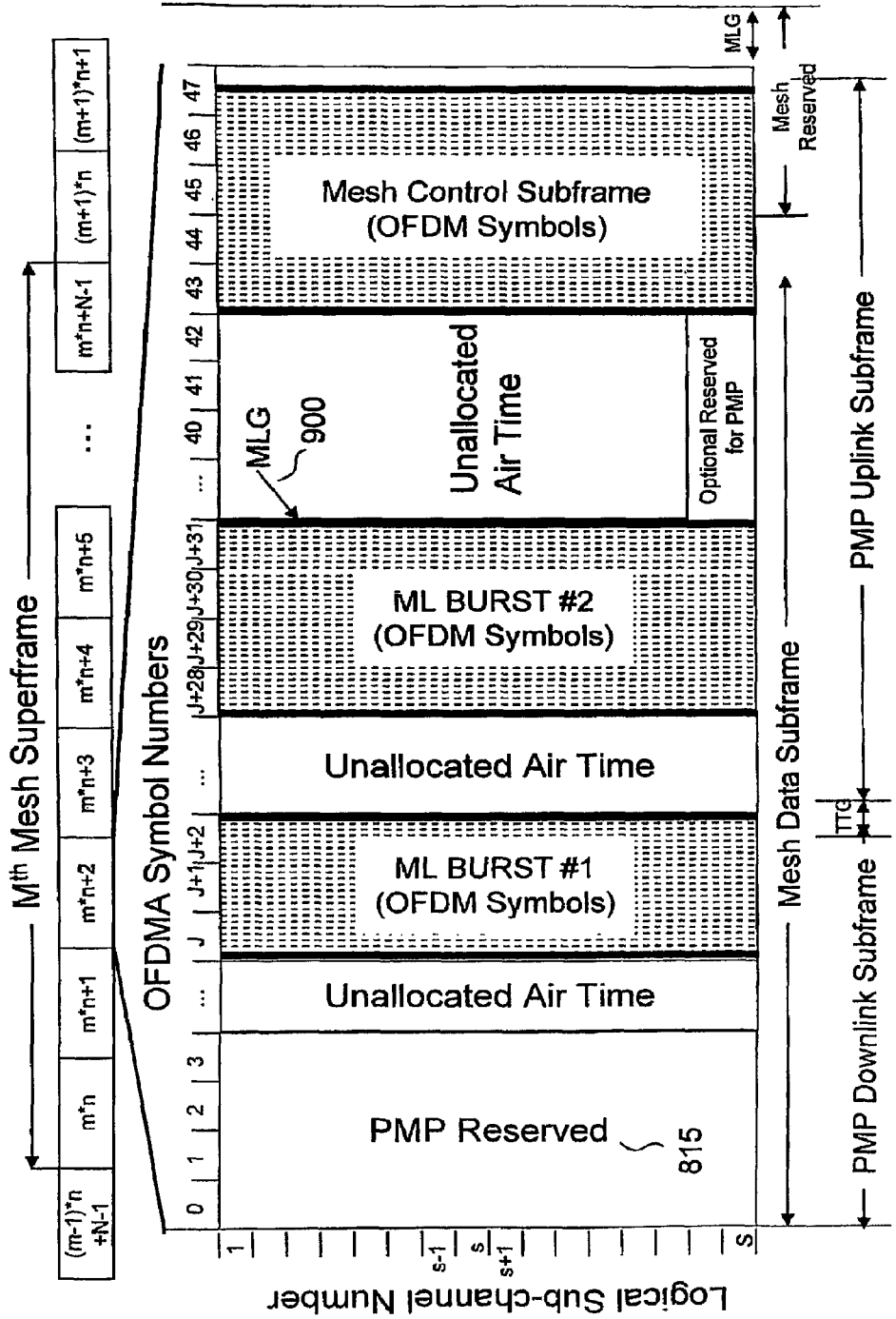
FIG. 9) PMP Compatible Mesh Frame Structure

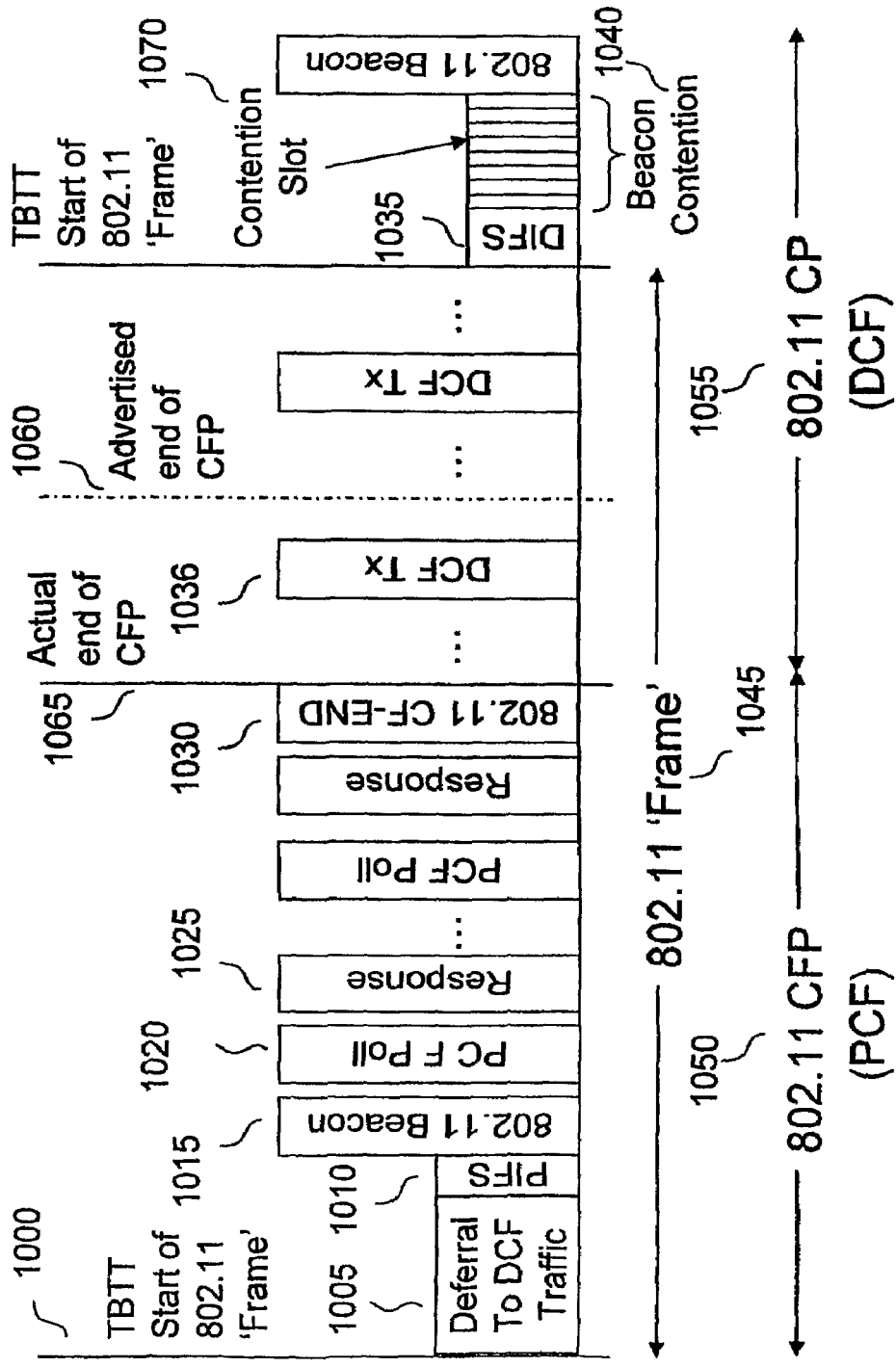
FIG 10) Simplified 802.11 Media Access

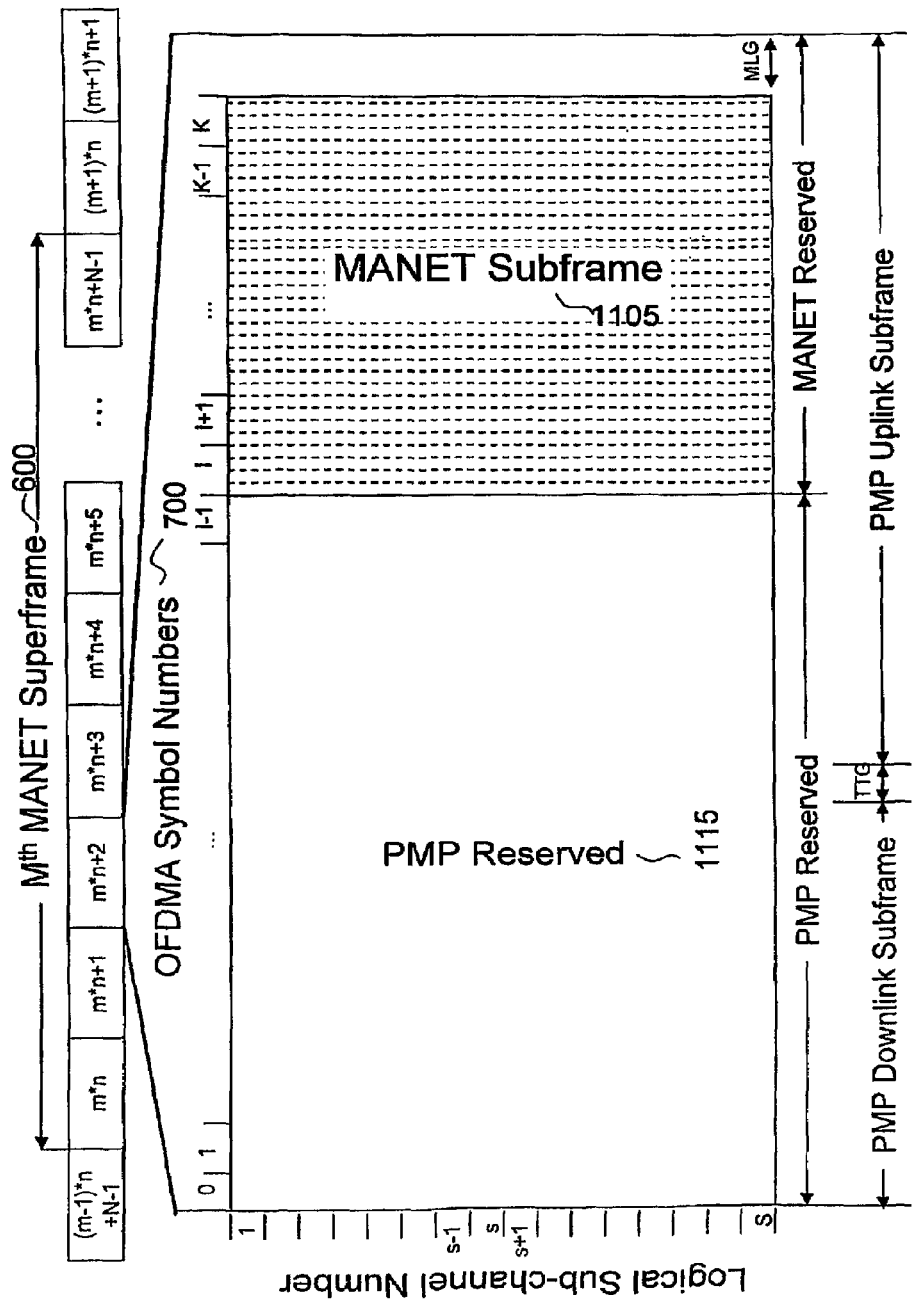
FIG. 11) 802.11 MANET Compatible PMP Frame Structure

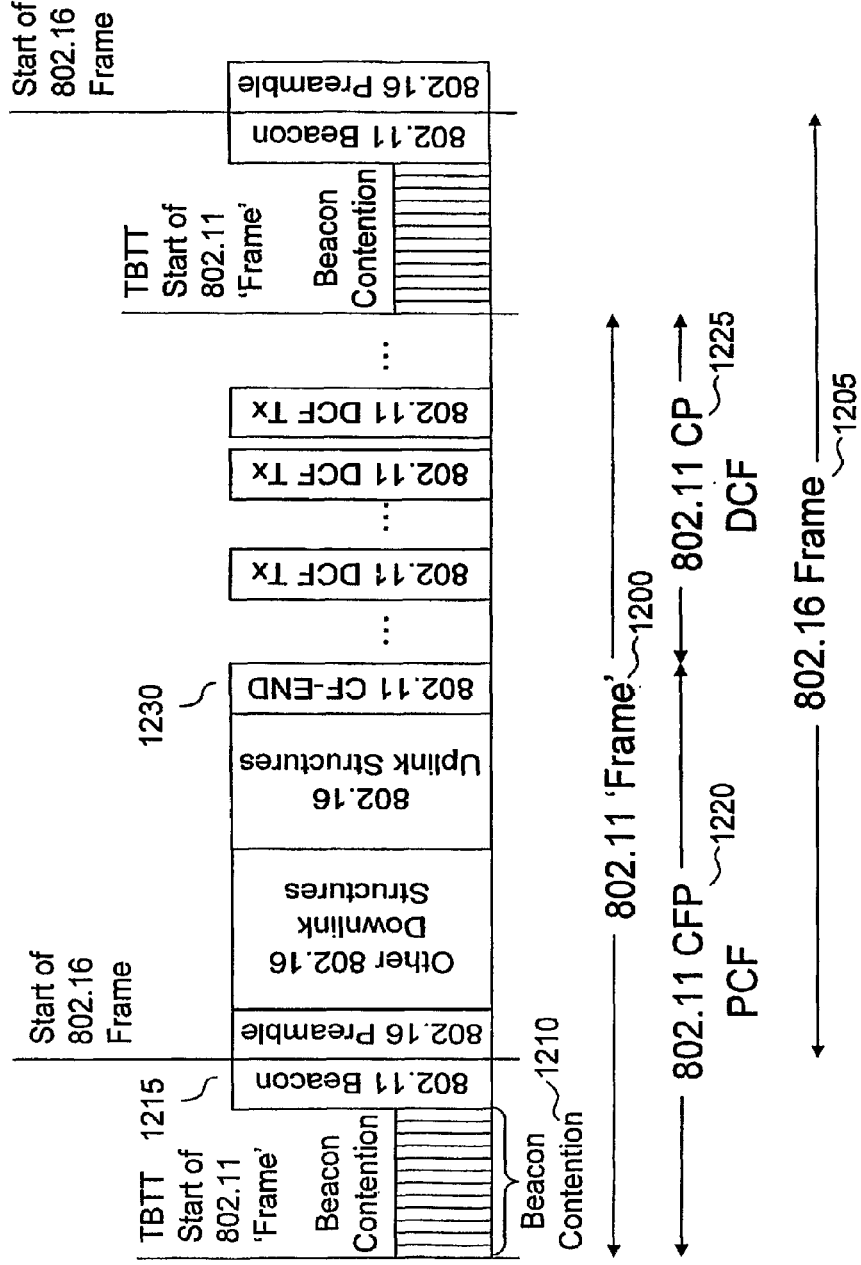
FIG 12) Combined 802.11 / 802.16 Frame Structure

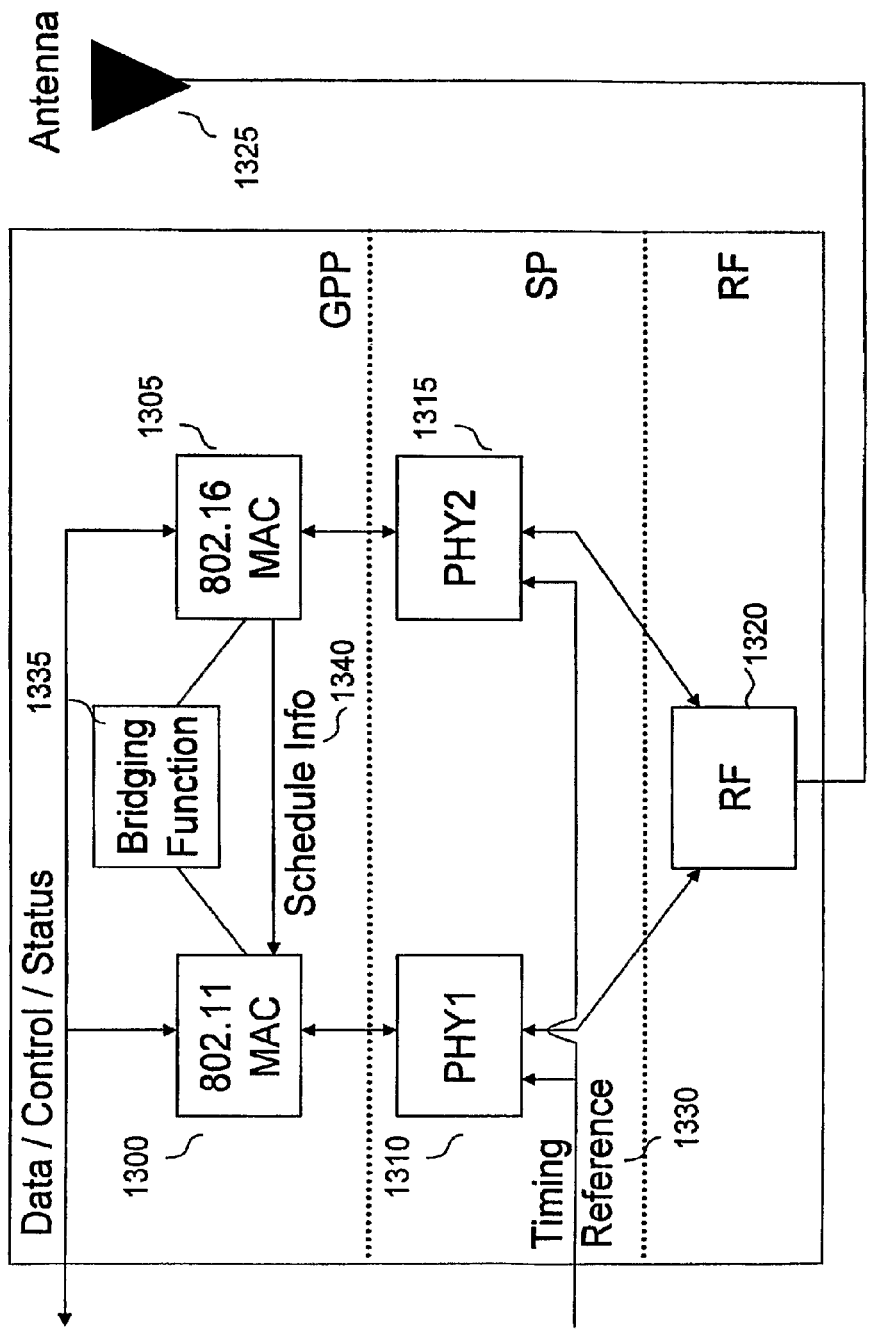
FIG. 13) Functional Description of Multi-Protocol Station

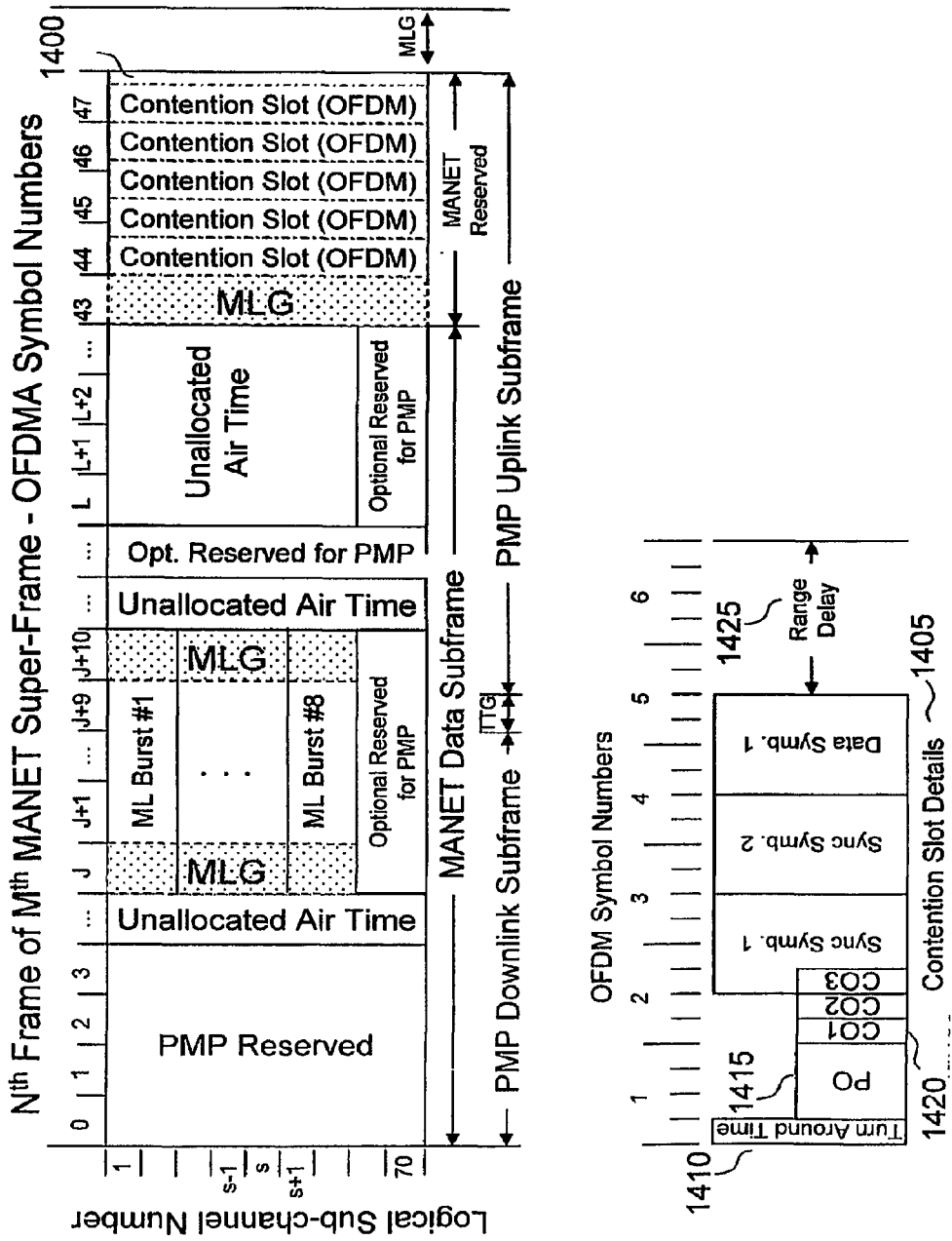
FIG. 14) PMP Compatible MM Frame Structure

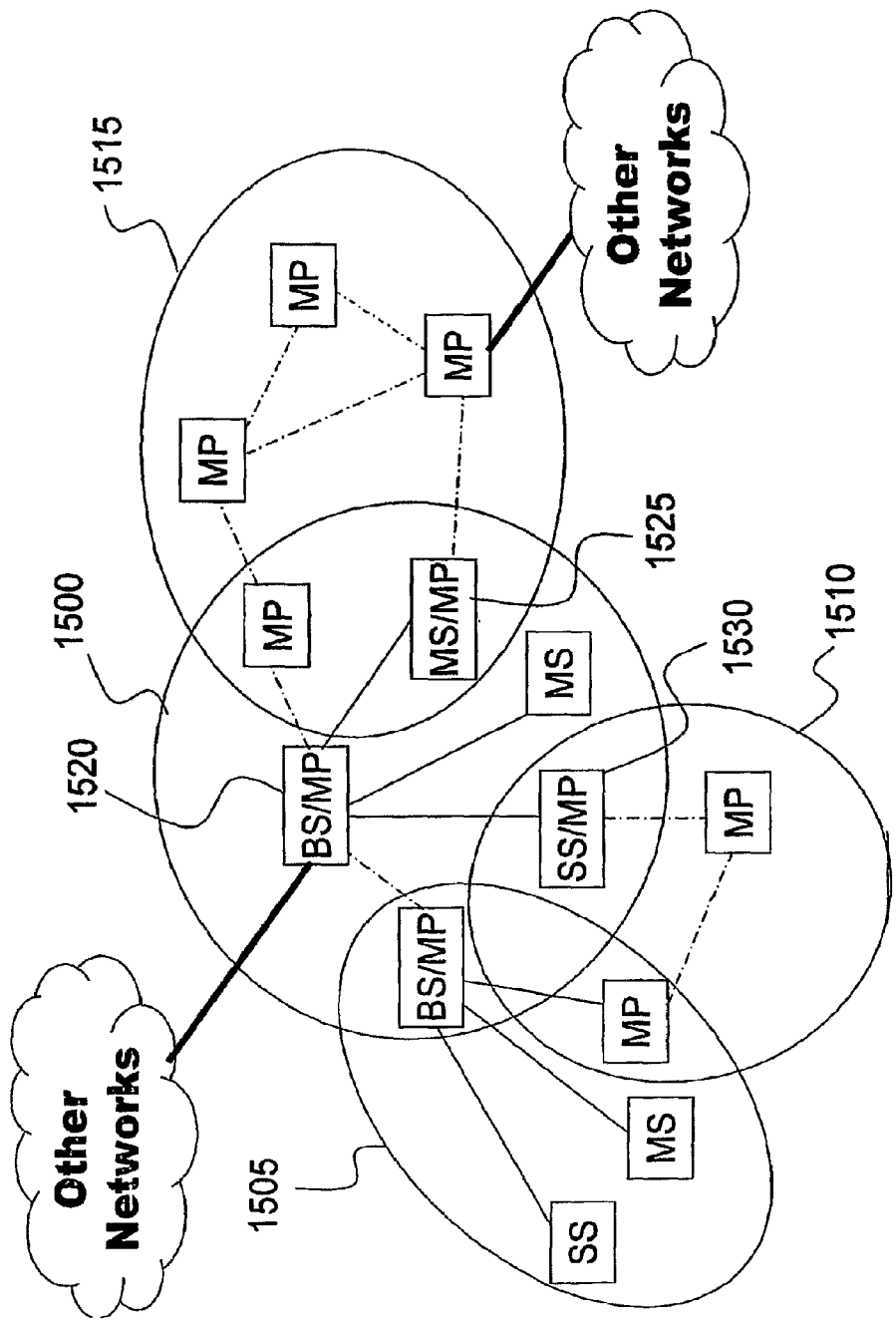
FIG. 15) Hybrid PMP / MANET Topology

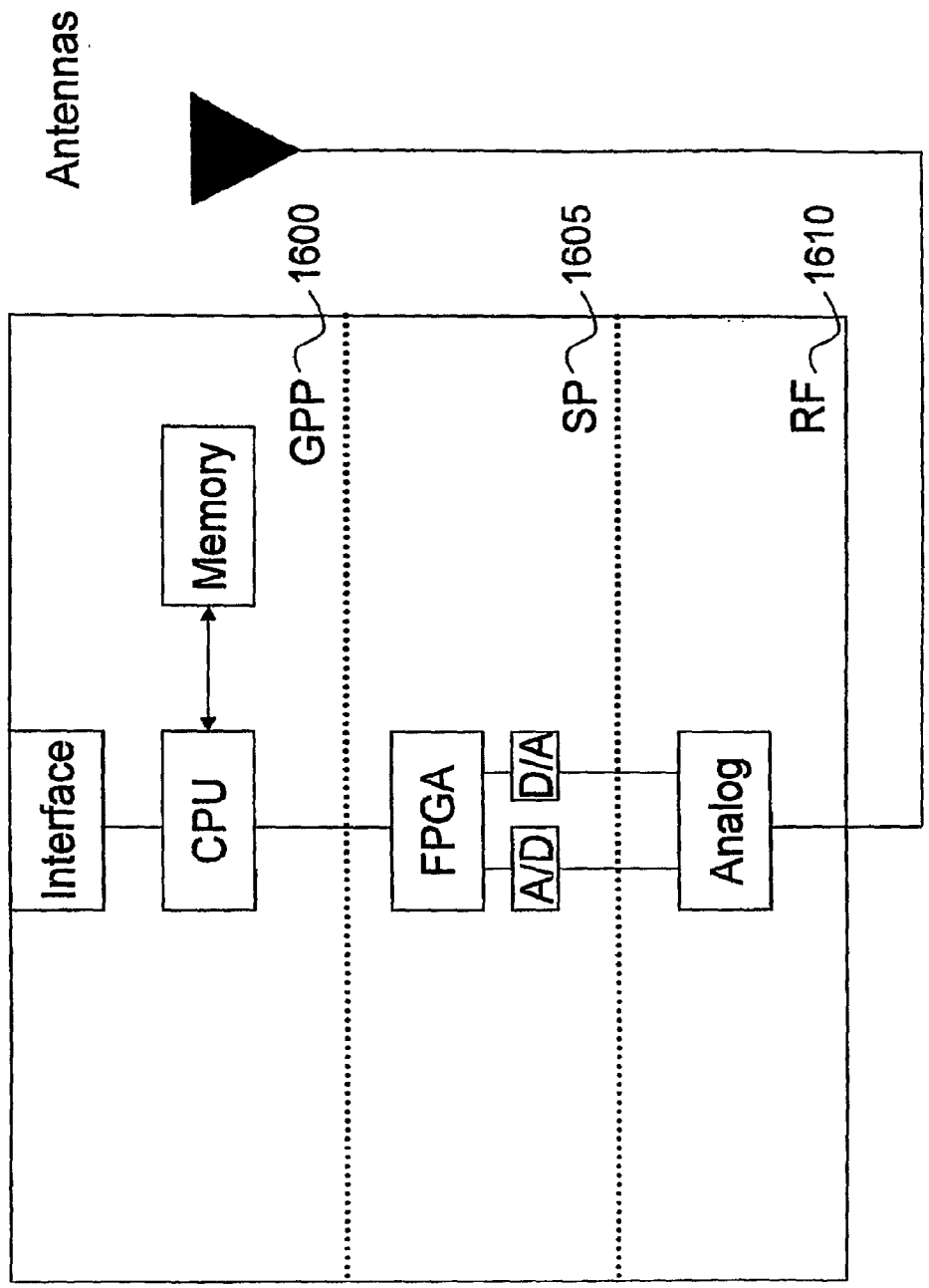
FIG. 16) Representative Apparatus

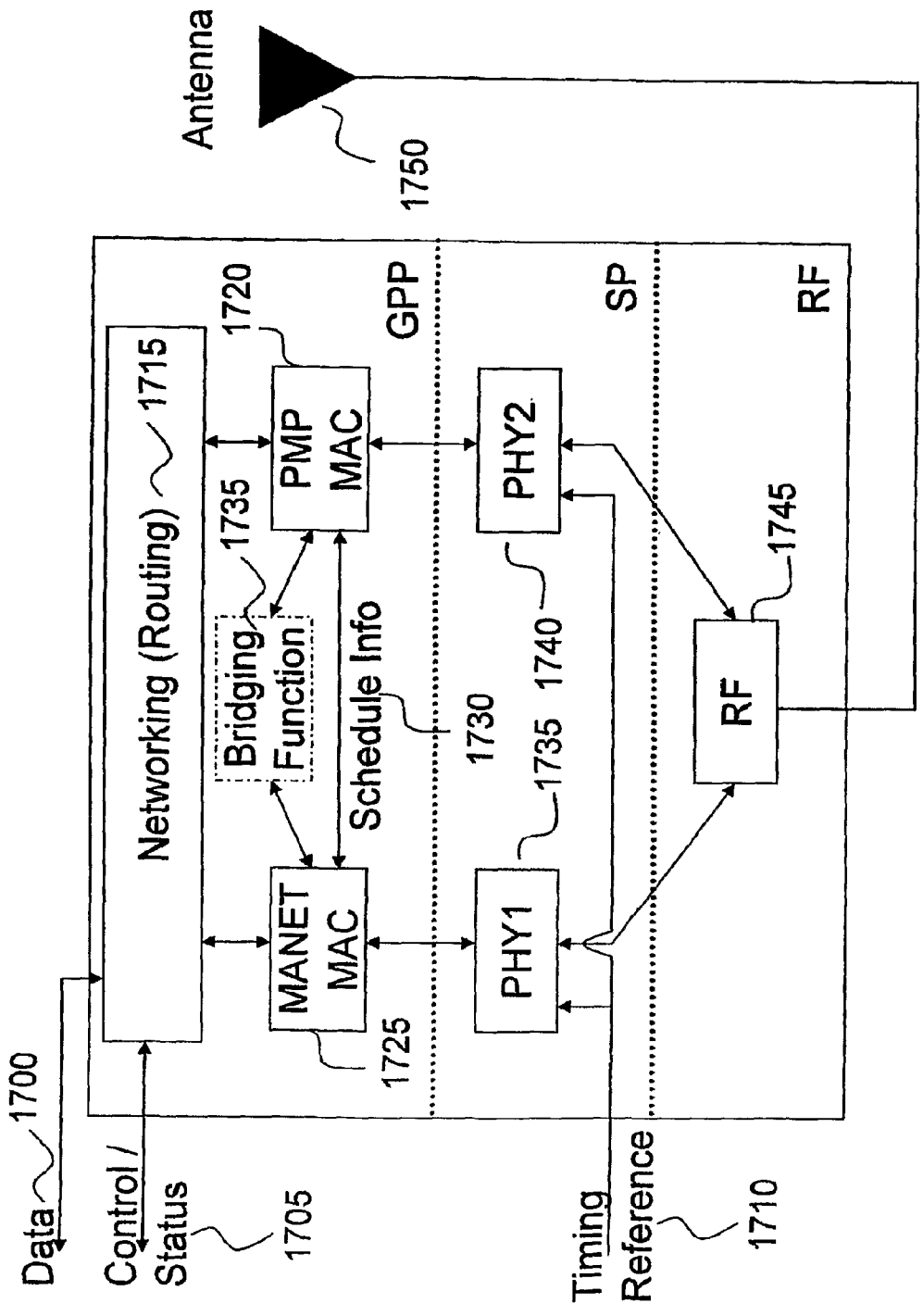
FIG. 17) Functional Description of Multi-Protocol Node

SUPPORTING MOBILE AD-HOC NETWORK (MANET) AND POINT TO MULTI-POINT (PMP) COMMUNICATIONS AMONG NODES IN A WIRELESS NETWORK

CROSS-REFERENCE TO RELATED APPLICATION

This application claims priority under 35 U.S.C. 119(e) of U.S. Provisional Patent Application No. 60/816,038 filed Jun. 23, 2006, and entitled "Method And Apparatus For Implementing Mobile Ad-Hoc Networking (MANET) Protocols In Conjunction With Point To Multi-Point (PMP) Protocols".

BACKGROUND OF THE INVENTION

1. Field of the Invention

This invention relates to wireless communication systems, particularly Point to Multi-Point (PMP) and mesh or Mobile Ad-Hoc (MANET) networks.

2. Discussion of the Known Art

Point to multi-point or PMP protocol communication equipment is used in various broadband wireless systems. The systems are typically standards-based, or are certified by industry trade groups, e.g., WiMAX Forum certified, IEEE 802.16-2004, IEEE 802.16d, IEEE 802.16e-2005, IEEE 802.16e, and HIPERMAN.

Communication equipment operating under mesh or mobile ad hoc network (MANET) protocols is often used in military applications. An example of a mesh network resides in the IEEE 802.16d standard which, in addition to a mesh mode, defines a PMP mode as well. The standard allows users to select only one of either a mesh or a PMP mode of operation on the network, however.

Allocations of new radio frequency (RF) bands for operation of wireless communication networks are often difficult to obtain. Because of this and for other reasons, it would be desirable to allow multiple network topologies or protocols (e.g., PMP, and mesh or MANET) to co-exist on any one channel or channels of a wireless network without causing interference among various communications taking place under each protocol. For example, a Relay Station (RS) may need to extend the coverage of an existing wireless PMP Base Station (BS) in order to allow a given node outside the existing coverage to join the network as a new subscriber station. In such a case, the BS and the RS could link with one another using the mesh protocol to coordinate the use of network channels, and thus allow the RS to operate as a PMP base station with respect to the new subscriber station.

In another example, two military convoys each employing a PMP system may need to maintain wireless connectivity between vehicles of their respective convoys while in motion. As the base stations of the two convoys pass near one another, it would be desirable for the two base stations to implement a MANET in order to coordinate their movements with one another while maintaining their individual PMP networks.

Yet another example is a military training exercise in which it becomes necessary to gather performance data from thousands of RF collection devices in the field. Each soldier may be provided with a wireless device for relaying data collected during the exercise. Such devices would operate most efficiently in a PMP network, but some of the devices might be outside PMP coverage and need to forward data through other wireless devices (other than a BS) so as to maintain connectivity. Again, a MANET or mesh network operating simultaneously on the same channel with the PMP network would meet such a need. The foregoing examples are merely illustrative and are not intended to limit the various circumstances in which the present invention may be used advantageously.

U.S. Pat. No. 7,031,274 (Apr. 18, 2006) discloses a method of enabling systems following the IEEE 802.11 protocol to interoperate with wireless local area networks (WLANs) that use an otherwise incompatible HIPERLAN/2 standard, on a common transmission channel. Further, U.S. Pat. No. 7,133,381 (Nov. 7, 2006) describes a method by which stations operating under an enhanced, IEEE 802.11e standard, can prevent interfering transmissions from stations that do not practice the 802.11e standard.

As far as is known, no solution has been proposed for enabling PMP and mesh/MANET protocols to coexist on a wireless network (including networks that follow 802.16 or are WiMAX based) while avoiding interference to communications conducted among nodes of the network using either protocol. Note that 802.11 has a PMP protocol of sort although it is not practiced or employed. It differs from other PMP networks (such as WiMAX), however, and techniques used to allow the 802.11 PMP protocol (called PCF) would not apply to other PMP networks.

SUMMARY OF THE INVENTION

According to one aspect of the invention, a method of allowing member nodes of a wireless point-to-multipoint (PMP) network to participate in mobile ad hoc (MANET) or mesh communications with other nodes on a shared set of channels without interfering with network communications exchanged using a PMP protocol, includes transmitting a downlink signal from a base station node to a number of subscriber station nodes in a PMP network, defining a downlink map in the downlink signal for scheduling first time periods for transmitting messages from the base station node to corresponding ones of the subscriber station nodes, and defining an uplink map in the downlink signal for scheduling second time periods for allowing a subscriber station node to transmit messages to the base station node in a scheduled second time period. In addition, the method includes allocating a MANET/mesh zone in either one or both of the downlink and the uplink maps, each zone operating to reserve one or more time slots and channels in which nodes using a MANET or mesh protocol, including the base and any of the subscriber station nodes, can communicate with other nodes using the MANET or mesh protocol and avoid interfering with network communications between the base and the subscriber station nodes under the PMP protocol.

According to another aspect of the invention, a multi-protocol wireless communications node has an interface component for providing control information or data to and from the node with respect to outside devices requiring communication services, a networking component coupled to the interface component for routing data to be transported by the node over either a link that follows a MANET or mesh protocol, or a link that follows a point-to-multipoint (PMP) protocol; a first medium access controller (MAC) component coupled to the networking component to implement the MANET or mesh protocol, and a second MAC component coupled to the networking component to implement the PMP protocol, wherein the first and the second MAC components are arranged to interface with one another for passing scheduling information.

The node also includes a radio frequency (RF) component, a first physical layer component coupled to the first MAC component and the RF component for (i) processing first data input from the first MAC component according to the MANET or mesh protocol, and outputting the processed first data to the RF component for transmission, and (ii) processing second data input from the RF component according to the MANET or mesh protocol, and outputting the processed second data to the first MAC component; and a second physical layer component coupled to the second MAC component and to the RF component for (i) processing third data input from the second MAC component according to the PMP protocol, and outputting the processed third data to the RF component for transmission, and (ii) processing fourth data input from the RF component according to the PMP protocol, and outputting the processed fourth data to the second MAC component.

For a better understanding of the invention, reference is made to the following description taken in conjunction with the accompanying drawing and the appended claims.

BRIEF DESCRIPTION OF THE DRAWING

In the drawing:

FIG. 1 is a block diagram of a typical PMP network topology;

FIG. 2 shows a typical MANET network topology;

FIG. 3 illustrates a typical PMP signaling frame structure;

FIG. 4 illustrates a typical IEEE 802.16d standards-based mesh signaling frame structure;

FIG. 5 shows a typical unifying slot assignment protocol (USAP) based MANET signaling frame structure;

FIG. 6 shows a PMP frame structure that incorporates MANET or mesh zones according to the invention;

FIG. 7 illustrates a PMP compatible MANET frame structure according to the invention;

FIG. 8 shows a PMP compatible USAP frame structure according to the invention;

FIG. 9 illustrates a PMP compatible mesh frame structure according to the invention;

FIG. 10 illustrates the IEEE 802.11 access protocols;

FIG. 11 shows an IEEE 802.11 standards-based MANET compatible PMP frame structure according to the invention;

FIG. 12 shows a combined IEEE 802.16 and IEEE 802.11 standards-based frame structure according to the invention;

FIG. 13 is a functional block diagram of a multi-protocol network station or node, according to the invention;

FIG. 14 shows a PMP compatible META-MANET frame structure according to the invention;

FIG. 15 shows a hybrid PMP/MANET network topology according to the invention;

FIG. 16 is a block diagram of apparatus capable of functioning as a multi-protocol network node according to the invention; and FIG. 17 is a functional block diagram of a multi-protocol network node according to the invention.

DETAILED DESCRIPTION OF THE INVENTION

As used herein, a "mesh point" (MP) is any node that is a member of a network and practices either MANET or mesh signaling protocols that are established for the network. According to the invention, the MP nodes may coexist as well as communicate with other member nodes of the network that practice PMP signaling protocols. The PMP protocols are defined herein in three protocol functionality suites, namely; Base Station (BS), Fixed Subscriber Station (SS), and Mobile Subscriber Station (MS). Specifically, coordination is established between the BS and the MP protocol sets. The SS and the MS protocol sets need not interact with the MP protocol set provided the former sets only participate in the PMP aspects of the network. It is, however, at times convenient as well as advantageous to be able to co-locate the SS or the MS protocols with the MP protocols at the same station or node in order to implement specific architectural elements.

A "Relay Station" (RS) is defined herein as an element containing specific subsets of the BS and the MP functionality. Specific architectural elements useful for MANET routing and topology control are also possible. These include, for example, concepts of a domain node (DN), a domain lead node (DL), and a bridge node (BN), as defined, e.g., in co-pending U.S. patent application Ser. No. 11/546,783, filed Oct. 12, 2006, entitled "Adaptive Message Routing for Mobile Ad Hoc Networks", and assigned to the assignee of the present application.

FIG. 1 is a block diagram illustrating an example embodiment of a wireless communication system or network that implements a Point to Multi-Point (PMP) topology. The network may practice one of many specific protocols, for example, IEEE 802.16-2004, IEEE 802.16e-2005, or related versions of these protocols such as WiMAX or HIPERMAN. The network of FIG. 1 may operate in, for example, radio frequency bands at approximately 400 MHz, 700 MHz, 2400 MHz, 3100 MHz, 4400 MHz, 4600 MHz, or 5800 MHz. Frequencies as high as 60 GHz or more are considered suitable for operation of the mentioned PMP protocols. Instantaneous channel bandwidth may range from less than 1 MHz to approximately 20 MHz. Bandwidths as high as 500 MHz or more are feasible. Nodes of the network may employ a wide variety of antennas such as, e.g., omni, fixed directional, sectored, beamforming or adaptive. Multiple Input Multiple Output (MIMO) as well as Multi-User Detection (MUD) networking technologies may also be applied in a known manner. Further, known Time Division Duplex (TDD) and Frequency Division Duplex (FDD) technologies may be applied as well.

A variety of currently known modulation and Physical Layer (PHY) implementations can also be employed in the network. Common modulation schemes include Orthogonal Frequency Division Multiplexing (OFDM), and Orthogonal Frequency Division Multiple Access (OFDMA). Single Carrier (SC) PHYs may also be used, as well as known spread spectrum techniques. Typical constellations used to modulate the carriers are Quadrature Phase Shift Keying (QPSK), 16 Quadrature Amplitude Modulation (16 QAM), and 64 Quadrature Amplitude Modulation (64 QAM). Other known modulation techniques may be practiced as well. Error Correction Coding (ECC) well known in the art such as, e.g., Viterbi, Reed Solomon, Turbo, and LDPC may also be utilized, possibly in combination with one another. Interleaving may also be applied in a known manner.

PMP networks are distinguishable from other wireless networks with respect to the organization of nodes in the network. For example, in FIG. 1, Base Station (BS) node 110 maintains a wireless coverage area 100 by the use of RF transceivers and one or more antennas. Any of the mentioned frequencies, PHYs, modulations, ECC, and constellations (as well as others) may be used to implement the PMP and other topologies described herein. A Media Access Controller (MAC) may also be used in a known manner to determine when various nodes in the FIG. 1 network should be either transmitting or listening within the coverage area 100.

A number of fixed Subscriber Station (SS) nodes 120, and a number of Mobile subscriber Stations (MS) nodes 130, may be situated within the coverage area 100. Those nodes interested in receiving services from BS node 110, register with the node 110 and form links with the node. The BS node 110 may be configured to control which nodes receive and transmit, and in which time intervals, through MAC messages.

PMP links are represented by thin solid lines such as link 140 in FIG. 1. SS node 120 and MS node 130 are configured to form links only with the BS node 110, and can not form links with one another even though they may be within RF communication range, i.e., one hop, of each other. The BS node 110 forwards communications (packets or messages) that originate from and are addressed to those nodes within the coverage area 100 that desire to communicate with one another. In addition, the BS node 110 provides connectivity for nodes within the coverage area 100 with nodes of other networks via, for example, the Internet. The thick line 150 in FIG. 1 indicates a communication link between the BS node 110 and other networks 160. The link 150 may be provided via a wired or a wireless interface.

FIG. 2 shows a typical wireless communication network having nodes (MP) configured to operate within a Mobile Ad Hoc Network (MANET) or mesh network topology. A MANET network has the property that any of its nodes may be in motion while communicating with one another. MANET networks are Ad Hoc in that it is not necessary for a central authority (such as the BS node 110 in FIG. 1) to have sole power to establish and to define the parameters of links between any two or more of the nodes MP of the network. Any two of the nodes may establish a link with one another independent of other nodes or communication entities in the network. The links may be transient, and they need not be pre-scheduled. In addition, the nodes of the MANET network in FIG. 2 are typically capable of maintaining multiple links with other nodes simultaneously.

The term mesh network may have a number of meanings. Typically, a mesh network is a special case of a MANET in that at least some of the network nodes MP are assumed to be static, and some amount of preplanning or scheduling may be required. In addition, some nodes may require communication with a central authority for the purpose of registration with the mesh network. In the present disclosure, the terms MANET and mesh are used interchangeably, with both terms implying the more general MANET unless stated otherwise.

The U.S. Department of Defense has experimented with MANET networks for a number of years. Examples of MANET networks include the Wideband Networking Waveform (WNW) and the Soldier Radio Waveform (SRW). Commercially, the IEEE 802.11 (or simply "802.11") waveform is often used to experiment with MANET networks since, in one mode of operation, the standard does support a degree of mobility requiring no centralized authority. An IEEE 802.11 Task Group (802.11s) is currently working on a "mesh" 802.11 solution that is not intended for mobility, although ongoing work by an 802.11p group may result in an IEEE 802.11-based MANET for use in Intelligent Transportation Systems (ITS) applications. A mode of IEEE 802.16-2004 includes a mesh capability wherein nodes are generally presumed to be static, and coordination with a centralized authority is required.

In general, MANET and mesh networks incorporate the same types of symbol constellations, PHY layers, modulations, ECC, interleaving, duplexing techniques, MIMO and MUD techniques, antenna types, frequency bands, and bandwidths as are used by PMP systems. MANET/mesh networks differ from PMP networks primarily in the configurations of their media access control (MAC) and networking layers.

In FIG. 2, the nodes that practice MANET or mesh protocols are termed mesh Point (MP) nodes. FIG. 2 shows a wireless coverage area 200 containing three nodes MP 210, 220, 230 which are within communication range of one another. Links formed among the nodes using MANET or mesh protocols are shown in dashed lines such as at 260.

Terms familiar to those skilled in the art include "one hop" and "two hop" neighbors. In FIG. 2, node MP 240 is a one hop neighbor of node MP 230 in that a single RF transmission is sufficient to communicate in either direction between the nodes MP 240 and MP 230. Node MP 240 is a two hop neighbor of node MP 210 in that a packet or message must undergo two RF transmissions to complete a path (via node MP 230) between the nodes MP 240 and MP 210.

For this example the three nodes MP 210, 220 and 230 are fully connected in that any one of them can link directly with the other two. The wireless coverage area (200) is representative of this connectivity. Another wireless coverage area 250 contains nodes MP 230 and 240 which can also link directly with each other, although node MP 240 cannot directly link with either one of the nodes MP 210 or 220. Thus, at the link level, the four nodes MP 210, 220, 230, and 240 are not fully connected with one another. MP nodes do, however, have an ability to forward network traffic from one link onto another link. For example, in FIG. 2, node MP 230 can forward traffic from its link with node MP 240, onto its links with either one of the nodes MP 210 or 220, and vice versa. This typically occurs at the network layer but may also take place at the MAC layer, as is known in the art. Thus, the node MP 240 can communicate in either direction with nodes MP 210 and 220, albeit through an intermediate node.

FIG. 15 is a block diagram of one embodiment of a wireless communication system or network implementing a hybrid PMP/MANET network topology, according to the invention. Four wireless coverage areas 1500, 1505, 1510, and 1515 are shown, wherein each node in a given coverage area is within RF communication range (i.e., one hop) of every other node in the given coverage area. Some nodes are identified as purely PMP elements, i.e., as being either an SS or an MS node. Other nodes are identified as purely MANET/mesh (MP) nodes.

A new set of nodes, each of which is constructed and arranged to practice multiple protocol sets according to the invention, are also shown in FIG. 15. For example, node 1520 is labeled BS/MP because it is configured to operate under a BS PMP protocol set and an MP protocol set. Node 1525 is labeled MS/MP because it is arranged to operate under an MS PMP protocol set and an MP protocol set. Node 1530 is labeled SS/MP because it is capable of operating under an SS PMP protocol set and an MP protocol set. Links formed between nodes using the PMP protocol set are shown as solid lines in FIG. 15, and links formed using the MP protocol set are shown as dashed lines. Any given node is equipped to establish a link with any of the other nodes of the network.

A set of heuristics may be employed to determine which protocol set (PMP or MANET/mesh) to use for a given link. An example set of heuristics would be as follows: BS, SS, and MS nodes exclusively use the PMP protocols. MP nodes exclusively use the MANET/mesh protocols. If a node is a BS/MP, it always accepts links from and serves MS, SS, MS/MP and SS/MP stations using the PMP protocols. A BS/MP always links to other BS/MP using the MANET/Mesh protocols. If an MS/MP or SS/MP is in range of a BS or BS/MP, it links with those nodes using PMP protocols. If an MS/MP or SS/MP is not in range of a BS or BS/MP, it links to other stations using the MANET/Mesh protocols. MS/MP, SS/MP, and MP stations never refuse a link from MS/MP, SS/MP and MP which cannot communicate directly with a BS or BS/MP. Other more complicated sets of heuristics are possible. Such heuristics might include the ability of nodes to change roles, for example, from an MS/MP to a BS/MP, and vice versa.

In the network of FIG. 15, both PMP and MANET topologies are subsumed into a hybrid PMP/MANET topology for the network. The techniques described herein may also be applied in networks or systems that share multiple RF channels, for example, OFDMA. To facilitate an understanding of the invention, the signaling frame structures currently used in PMP, mesh and MANET network protocols, are explained first below.

FIG. 3 shows a typical PMP frame structure that is used in a TDD system with OFDMA modulation, but analogies for FDD and the other modulations types identified (particularly for OFDM and single carrier) are known to those skilled in the art. Further details of the PMP frame structure of FIG. 3 may be found in the IEEE 802.16-2004 and 802.16e-2005 standards which are incorporated by reference.

A PMP frame is comprised of many RF "bursts". A Downlink Subframe 325 includes a set of bursts all of which originate at a BS node and are destined for one or more SS or MS nodes previously registered with the BS node. Some of the bursts have special purposes. For example, the Preamble 300 indicates the start of the frame and also facilitates time and frequency synchronization within the network. Other key bursts may include a Frame Control Header (FCH) 305 which details key PHY properties that are needed to interpret other RF bursts in the frame, a Down Link (DL) MAP 310 which details where the various DL bursts are located within the frame, and an Up Link (UL) MAP 315 which details where various UL bursts are to be located. The BS node defines and generates all the mentioned bursts at the beginning of each frame. After these initial bursts, a series of DL data bursts such as DL Burst #1 320 are provided as scheduled in the DL MAP 310.

The Downlink Subframe 325 is followed (for TDD systems) by a Transmit/Receive Transmission Gap (TTG) 330 during which there are no intentional transmissions. This time period allows for SS nodes in the network to switch from a receive to a transmit mode, and for the BS node to switch from a transmit to a receive mode of operation. An Uplink Subframe 335 then follows the TTG 330. The subframe 335 includes bursts from one or more SS or MS nodes all of which bursts are destined to the BS node. Several of the burst allocations may also have special purposes. These include ACK-CH 340, Ranging 345, and Fast Feedback (CQICH) 350 the functions of which are known to those skilled in the art and defined in the IEEE 802.16-2004 and 802.16e-2005 standards. In addition, Uplink data bursts such as UL Burst #1 355 may occur. As mentioned, the positions of all Uplink traffic are defined by the UL MAP 315 transmitted from the BS node during the Downlink Subframe 325. Finally, a Receive/Transmit Transmission Gap (RTG) 360 may be provided to allow the network stations again to switch their receive/transmit modes.

The scheduling of the bursts is an important consideration in a PMP network. This is accomplished by using "slots". In a most general case, a slot is a "tile" whose dimensions correspond to the smallest number of modulations symbol periods that can be scheduled, by the smallest number of logical subchannels that can be scheduled. The subchannels roughly correspond to frequency groups; but because of the particular modulation/coding techniques implemented in the network, adjacent logical channels may not always correspond to physically adjacent frequencies.

FIG. 3 shows slotting based on OFDMA symbols. When the smallest number of logical channels that can be allocated into a slot equals all of the available logical subchannels, then the OFDMA topology degenerates into OFDM. If in fact only one logical channel is available and the channel contains a single frequency, the modulation scheme degenerates into single carrier.

The minimum number of logical subchannels in a slot and the minimum number of modulation symbols in a slot, may differ in the Uplink Subframe 335 from that which exists in the Downlink Subframe 325. Also, while the total number of modulations symbols in a frame may be well defined, the partitioning between uplink and downlink phases for TDD systems is not. That is, the timing of the TTG 330 can change depending on current needs of the system. Thus, varying numbers of modulation symbols may occur in each subframe of a given frame. Further, the TTG and the RTG gaps 330, 360 need not be multiples of the modulation symbol time. Modulation symbols in the Uplink Subframe 335 may not align with a constant time base triggering off the start of each frame. The TTG 330 may, or may not, be in a fixed location for every PMP frame depending on the specific implementation.

FIG. 4 shows a typical mesh frame structure based on the IEEE 802.16-2004 (802.16d) standard and known to those skilled in the art. Frame Boundaries 400 are indicated, and the length of the frame is configurable. The frame is divided into a number of subframes, the first of which is a Network Control Subframe 405. Details of the Subframe 405 are shown at the lower left in the figure, wherein the subframe 405 is divided into transmit opportunities the first of which is for Network Entry messages 410. A number of transmit opportunities for Network Configuration messages 415 are also provided. The number of transmit opportunities in the Network Control Subframe 405 is a network parameter. A Data Subframe 420 follows the Network Control Subframe 405. The number of Data Subframes 420 is also a network parameter.

Each Data Subframe 420 contains a relatively large number of minislots 425. The minislots 425 are each smaller than a complete message but allow for a great deal of scheduling granularity and efficiency. Between the Data Subframes 420 are Schedule Control Subframes 430. The structure of a Schedule Control Subframe 430 is shown at the bottom right of FIG. 4. The Subframe 430 includes a number of Schedule Control Transmit Opportunities 435 for Schedule Control Messages. Two basic types of scheduling are supported, namely; Centralized 435, and Coordinated Distributed 440. The total number of Schedule Control transmit opportunities, and the split between the Centralized and the Coordinated Distributed transmit opportunities 435, 440, are network and system parameters. In addition, Uncoordinated Distributed Schedule Control messages 445 may be contained within a Data Subframe 420.

FIG. 5 is an example MANET frame structure based on a protocol known in the art as Unifying Slot Assignment Protocol (USAP), and described by C. David Young in "USAP Multiple Broadcast Access: Transmitter- and Receiver-Directed Dynamic Resource Allocation for Mobile, Multihop, Multichannel, Wireless Networking", IEEE MILCOM 2000, at pages 549-53. A Superframe 500 includes a number of successive frames. Components in all of the frames are similar, but their usage varies and repeats after a given number of frames. For example, components in frame 505 ($1^{st}$ frame) are shown, including a set of network control slots 510. The control slots 510 are of a fixed size so as to allow a single network control message to be transmitted from a single node in each such slot. Different means may be used to allocate the control slots among the network nodes, as described in the USAP protocol and known to those skilled in the art. A separate set of fixed size slots are reserved for Broadcast Data

515. The slots 515 are allocated for users according to the USAP protocol using means known to those skilled in the art. The size of the Broadcast Data slots 515 may differ from the size of the Network Control Slots 510.

A separate set of fixed size slots are defined as Unicast Data Slots 520. The Unicast Data Slots 520 may also be used for Broadcast Data. The slots 520 are allocated for users according to the USAP protocol by means known to those skilled in the art. The USAP protocol operates across multiple frequency channels 525. Slots are allocated across the channels according to the protocol and means known to those skilled in the art.

FIG. 10 represents a typical media access scheme as described, for example, in IEEE 802.11-1999 ("802.11"). No formal frame is defined in 802.11; however, a Target Beacon Transmit Time (TBTT) interval 1000 and other associated 802.11 constructs that are multiples of the TBTT 1000 can be used as a Start of Frame reference. Note that the meaning of the word "frame" in the IEEE 802.11 standard is roughly equivalent to the term "message" as used in the present disclosure. The 802.11 protocol requires that a Beacon message 1015 be transmitted approximately at a time corresponding with the TBTT 1000. How this is accomplished depends on the particular coordination function that is active when the TBTT 1000 occurs.

Two coordination functions are defined within IEEE 802.11, namely; the Distributed Coordination Function (DCF) and the Point Coordination Function (PCF). The DCF is used during an 802.11 Contention Period (CP) 1055. The PCF is used during an 802.11 Contention Free Period (CFP) 1050. If the TBTT 1000 occurs during the CP 1055, then a Beacon Contention phase 1040 begins. The Beacon Contention 1040 allows all Access Point (AP) or Independent Basic Service Set (IBSS) participants to send Beacons. If any traffic currently exists on the channel as at 1005, then all stations defer until the channel clears. Once the channel clears, contending stations defer for a DCF Inter-Frame Space (DIFS) time 1035. Then, each station defers by a random number of contention slots 1070. AP stations or nodes will always send their Beacons and will continue the deferral process until each station is allowed to transmit. In an IBSS, all stations participate and take turns transmitting the Beacon. Each station defers by a random time, and the station with the shortest deferral time is allowed to transmit. Once a Beacon is successfully transmitted, stations in the IBSS do not attempt to send a beacon again until the next TBTT 1000 in a CP.

AP nodes implementing a CFP under the PCF follow a different beaconing procedure. An AP node defers to DCF traffic as before, and then waits a PCF Inter-Frame Space (PIFS) time 1010. No Beacon Contention is required, however, and a Beacon Message 1015 is transmitted immediately. The PIFS is shorter than a DIFS, thus ensuring that the PCF Beacon is favored over other Beacons.

FIG. 10 also illustrates access techniques practiced under 802.11. MANET networks are often built around the DCF function in 802.11. See, e.g., R. J. Hall, et al., "A Tiered Geocast Protocol For Long Range Mobile Ad Hoc Networking", MILCOM 2006; and J. P. Hauser, et al., "Mobility and Routing Protocols For 802.11 Extended Service Sets", U.S. Naval Research Laboratory MILCOM 2003, at pages 1036-41. Under the DCF, each station or node decides when it should transmit based purely on local information such as the media state and local state machines. An example DCF transmission which could be used for MANET communications is shown in the figure as DCF Tx 1036.

FIG. 10 further shows some details of PCF communications as may be relevant to the present invention. Communications using the CFP are coordinated by an AP node acting as a central control station. During the CFP, other nodes associated with the AP node may only transmit messages if polled by the AP node. PCF Poll 1020 and Response messages 1025 are shown in the figure. The length of the CFP, and which TBTT are associated with the CFP, are predefined by the AP node and advertised in the PCF Beacon messages. A node that hears the PCF Beacon knows the start of all the CFP and the Advertised End of each CFP 1060. If an AP node decides that no further PCF communications are necessary prior to the advertised end of the CFP, it can cause the Actual end of the CFP 1065 to occur early by transmitting an 802.11 CF-END message 1030. This permits DCF messages to take advantage of time that would otherwise be left open.

As mentioned, the present invention enables PMP systems and MANET or mesh systems to interoperate with one another on a given network channel or channels. Accordingly, critical frame components of PMP and of MANET/mesh frame structures are mapped into a common frame structure, by retaining critical components of both protocols and reserving air time within the frame structure for operational needs of either protocol.

FIG. 6 illustrates a PMP frame structure that is modified to incorporate MANET Zones according to one embodiment of the invention. Variable parameters identified previously for PMP networks, for example, types of constellations, PHY, modulations, duplexing techniques, MIMO/MUD techniques, antenna types, frequency bands, and bandwidths of operation, may all apply to the PMP/MANET frame structure of FIG. 6. A preferred embodiment may, however, adaptively select between QPSK, 16-QAM and 64 QAM modulations based the available Signal to Interference plus Noise Ratio (SINR), use OFDMA PHY modulation for the PMP traffic (as defined in the 802.16-2004 and 802.16e-2005 standards), employ a combination of Viterbi and Reed Solomon ECC with interleaving as defined in the standards, use a time division duplex (TDD) transmission scheme, operate at around 400 MHz without MIMO and, use omni antennas, and have a 20 MHz Bandwidth. Further, it may be preferable to use a MAC as defined in the IEEE 802.16 standards and modified as described herein to coexist with MANET protocols.

In the PMP frame structure shown in FIG. 6, the frame size may vary from about one millisecond to one second, with about five milliseconds being preferred. In FIG. 6, a Superframe 600 has N frames. N would normally be fixed, but could be variable depending upon a specific MANET protocol selected for implementation. Integers between 1 and 1024 are examples of acceptable values, although larger values are within the scope of the invention. A preferred embodiment would use, for example, N=200. Key aspects of the PMP frame of FIG. 3 are preserved, and labeling of those aspects has also been preserved.

In the structure of FIG. 6, reserved portions are introduced in the frame some of which are labeled as mesh or MANET Zones (MZ). According to the invention, PMP BS nodes may also operate as MP nodes and thus must be fully aware of the MANET/mesh frame timing and scheduling established for the network. The scheduling entity that defines the PMP frame format must therefore account for time periods used by the MANET protocols as the MANET Zones, and ensure that no scheduling conflict will arise between MANET traffic and PMP traffic. The MANET zones are scheduled in the DL MAP 310 and the UL MAP 315 in FIG. 6 using reserved codes or other means to indicate that the zones are not available for PMP use. Heuristics known to persons skilled in the art may be employed to ensure that MANET traffic will not prevent proper operation of the PMP network.

For example, a MANET scheduler may be configured so that not more than 50% of the PMP frame is ever used for MANET constructs, thereby ensuring that at least as much time is available for PMP constructs. Smaller values, e.g., 5% or 10% are also possible as well as larger values (e.g., 90%). The MANET zones may encompass all network frequency channels during a determined time slice as in MZ #1 605 and MZ #2 610, or occupy only a portion of the logical frequency band as in MZ #3 615. The MZ may occur in the downlink portion of the PMP frame as for MZ #1 605, or in the uplink portion as for MZ #2 610. In a preferred embodiment, the MZ would correspond to sets of Uplink or Downlink scheduling time slots as appropriate. It is also preferred that the PMP scheduler be aware of other MP nodes operating as SS nodes or MS nodes on the PMP system, and ensure that the MZ includes adequate time to change transmission modes (receive or transmit) based on traffic being received by the MS or SS nodes operating in the MANET/mesh network. Some portions of the frame time are preferably always reserved for MANET/mesh operation. This would support network control transmissions for the MANET network, but may also include dedicated time for MANET data transmission. The amount of time reserved would then become a PMP network parameter.

FIG. 7 illustrates a MANET frame structure that is compatible with a PMP operating protocol according to the invention. All of the mentioned system parameters that may be selected for a typical PMP network, including types of constellations, PHY, modulations, duplexing techniques, MIMO/MUD techniques, antenna types, frequency bands, and bandwidths of operation, may be applied in the MANET/mesh networks disclosed herein. Preferably, the same values of these parameters as given for the PMP network in FIG. 6, apply to a network operating with the frame structure of FIG. 7 but for certain exceptions noted below.

FIG. 7 shows the same MANET Superframe structure 600 as shown in FIG. 6. The same frame (identical PMP frame structures and same frame index) as in FIG. 6 is considered. Accordingly, while the field structures and data indicated in the frame in FIG. 6 are not labeled as such in the frame of FIG. 7, they may in fact to be fully presented in the reserved or unallocated portions of the MANET frame of FIG. 7. It is assumed that the MANET scheduling is based on time slot sizes that differ from those used by the PMP nodes in the network. Also assume that the MANET keeps track of its schedule based on a modulation symbol index 700 with respect to the start of the frame, and that the MANET nodes use OFDMA modulation symbols for data in the frame structure of FIG. 7.

A preferred embodiment maintains the symbol index and time slots based on the use of OFMDA modulation symbols, but would advantageously switch modulations during the ML Bursts and the MANET Control Subframe 705. For example, if a 2048 tone OFMDA modulation is used for data, switching to a 256 tone OFDM of the same bandwidth may be advantageous during the MANET Control Subframe 705 in that the symbols are of shorter duration. As indicated by the doted lines, eight OFDM symbols may fit in the same time interval as one OFDMA symbol with a little room to spare. The use of OFDM symbols makes allocations of transmit and receive turnaround gaps easier for short broadcast messages which may include Control messages.

If multiple nodes transmit broadcast messages in an OFDMA frame simultaneously but at different frequencies, they would be unable to hear one another since they cannot transmit and receive at the same time during a given OFDMA symbol. This defeats the purpose of broadcast messages, so using symbols that are shorter in time wherein each time slice is occupied by a single user, has advantages. Other scheduling slot structures may also be employed, and the timing reference point may be at the start of the entire Superframe rather than at the start of each frame.

A PMP reserved section 715 is provided in the MANET Data Subframe 710 to ensure that no MANET traffic will interfere with critical PMP fields at the beginning of the subframe 710. This minimally covers (from FIG. 6) the structures 300, 305, 310, and 315, and may also cover some portion of the data in the PMP Downlink Subframe. The exact portion of the subframe 710 that is reserved is set as a MANET Network parameter. MANET Link (ML) bursts are defined based on time and logical (frequency) channel "slots" similar to those used in USAP. The percentage of the frame that can be occupied by MANET traffic may be set as a MANET network parameter, and preferably is not more than 50%. ML bursts may be limited to a subset of the total number of channels available in the same way they are limited in the PMP network, and in the USAP frame structure (FIG. 5). An example of this is ML Burst #3 720 in FIG. 7. The same mechanisms used to allocate USAP traffic across frequency channels may be used for the frame structure in FIG. 7, as will be apparent to persons skilled in the art. The logical subchannels in FIG. 7 may be substituted for the frequency channels 525 used in FIG. 5.

As noted, simultaneous transmissions in an OFMDA frame format may be problematic. The applicable slot assignment algorithm must employ a heuristic to ensure that nodes of the network do not transmit in OFDMA symbols when the intended receiving node is transmitting in a different logical channel of the same OFDMA symbol. Such a heuristic may not even be sufficient because some time is required to switch from transmit to receive. Thus, if the intended receiving node was transmitting in the symbol before, or needs to transmit in the symbol after, then a gap of some sort may need to be inserted in the transmissions. This is true for OFDM and SC as well as OFDMA.

In FIG. 7, MANET Link Gaps (MLG) 725 are strategically placed immediately before and after each of the ML Bursts. The MLG 725 are one symbol wide, but may be shorter, for example, one-half symbol wide before and after the actual burst. Because OFDM and OFDMA symbols often include a cyclic prefix, it may not be necessary to include the MLG 725. Thus, the gaps are considered optional and there inclusion will depend on modulation, propagation, and other system parameters. In addition to the front portion of the frame, it may be desirable to reserve other portions of the frame to avoid conflicts with other PMP functions such as, e.g., ranging or Fast Feedback. Such reservations may be considered optional.

FIG. 8 depicts a PMP compatible USAP frame structure according to the invention. For example, a 20 MHz wide Channel with 2048 OFMDA tones is used for the PHY. The frame is five milliseconds long, and the super frame 600 is of one second duration. USAP allocation mechanisms known in the art are used to define unicast and broadcast data transmissions. A subcycle occurs every 125 msec (every 25 frames), and corresponds to a USAP "frame". Each frame has up to eight ML bursts all of which occur during the same nine OFMDA symbols but in different logical sub-channels. Depending on the coding scheme, there may be spare logical channels within the nine OFMDA symbols used. For example, if there are 70 logical subchannels and eight logical subchannels per ML burst, then six logical subchannels are unused. The unused subchannels may be grouped together, or used to provide logical channel gaps between the ML bursts.

The eight ML bursts correspond to eight frequencies in the USAP protocol. In 25 frames on a single logical channel, there are 25 "Slots" in a subcycle. The first slot, and every fifth slot thereafter, are "broadcast" slots. The other 20 slots play the same role as the "reservation/standby" slots in the USAP protocol.

PMP networks treat the last four symbols of the 48 symbol frames as reserved for the MANET Control Subframe. OFDMA modulation symbols are used in the MANET Control Subframe. Three symbols are used to implement "bootstrap" slots. This provides 20 sets of bootstrap slots per subcycle. Because they are broadcast, however, it is expected that only the lowest numbered bootstrap slots would be used in each frame. Slots that occupy adjacent Logical Sub-Channels of the same OFMDA symbol set could be aggregated into larger slots for more signaling capacity, if needed.

These numbers correspond to more slots in all regards than called for in the basic USAP frame format. Extra slots can simply be truncated and the exact USAP algorithm implemented. One skilled in the art may, however, extend the basic USAP protocol for greater performance by taking advantage of the additional capabilities.

In all, 15 out of 48 symbols are allowed for use in following the MANET protocol. The ML Burst size may be adjusted to increase the capacity, or to add more slots and increase control capacity. Also, the ML bursts are indicated as starting after the $J^{th}$ symbol. a preferred embodiment would, however, group the ML bursts adjacent with the MANET Control Subframe, and thereby force J to a value of 33.

Unallocated air time is used by the PMP components of the network. Also, since a PMP BS node listens to the signaling in the MANET component of the network, the BS node can allocate MANET slots that are not in active use to PMP users on a temporary basis. IEEE 802.16 uses different permutation zones depending on how the PHY is configured during a particular area in a PMP frame. Preferably, all of the MANET/mesh nodes use the same permutation zone setting for their MANET communications.

FIG. 9 depicts a PMP compatible mesh frame structure based on the mesh network defined in IEEE 802.16-2004, according to the invention. Again, the structure contemplates a 20 MHz bandwidth and a five millisecond PMP frame length. The PMP communications are assumed to be OFDMA, and all mesh communications (Data and Control) are assumed to be OFDM. The mesh minislots 425 in the mesh frame structure of FIG. 4, are preferably set equal to the OFDMA symbol time which is assumed to be about 8.2 times the OFDM symbol time. The exact amount depends on the modulation parameters selected. The use of an OFDMA symbol as a minislot deviates from the standard convention of defining minislots as multiples of the underlying PHY modulation (OFDM for mesh communications). From a transmission scheduling perspective, however, all that matters is that the exact time which transmissions start, is known. The use of OFDMA symbol times as minislots is therefore easily accommodated. The MLG described earlier still exist, but are comprised of a single OFDM symbol each. In FIG. 9, MLG are confined within the mesh minislots and are represented in darkened bands 900.

In the illustrated embodiment, the number of minislots per frame is restricted to 32 (out of 48 symbols total). The first four symbols of the frame are reserved at 815 for PMP protocol communications in the network. The parameters for the mesh Control Subframe are selected so that five Transmit Opportunities are provided every Control Subframe, each consisting of seven OFDM symbols. This means that five OFDMA symbols must be reserved for the mesh Control Subframe.

The first Transmit Opportunity is timed relative to the start of the time reserved for the mesh Control Subframe. A subcycle of four frames (20 milliseconds) exists within the mesh Superframe which is one second long. Starting with the first mash mesh frame of the Superframe, the mesh Control Subframe of every fourth mesh frame is dedicated for the Network Control Subframe function shown in FIG. 4 at 405. At all other times, the mesh Control Subframe performs the Schedule Control subframe function depicted in FIG. 4 at 430. Because all unallocated mesh capacity is allotted back to a PMP function, uncoordinated distributed control function messaging is not supported in the frame structure of FIG. 9. Such messaging could, however, be supported if OFDMA symbols are dedicated for that function.

As noted earlier, IEEE 802.11 can provide a basis for a MANET or mesh protocol. In accordance with the invention, it may be convenient to use 802.11 constructs for some or all aspects of a mesh or MANET frame that is capable of sharing a channel with 802.16 PMP traffic. For example, in the frame structure shown in FIG. 7, IEEE 802.11 DCF protocols may be used to carry control traffic in MANET Control Subframe 705. In such a case, the mesh Schedule and Network Control messages would be transmitted as data messages over 802.11. Also, an 802.11 PHY may be used just in this Subframe, instead of an 802.16 PHY. Moreover, one skilled in the art could substitute the basic 802.16 OFDM modulation for 802.11 OFDM modulation, and thus simplify the modulator/demodulator requirements. Data traffic would still travel in ML bursts using the OFDMA or OFDM modulations specified by 802.16. Yet another alternative would be to use the 802.11 protocols to carry not just mesh or MAN ET control traffic, but the MANET data as well.

FIG. 11 illustrates an 802.11 MANET Compatible PMP Frame Structure that may be implemented in a case where 802.11 constructs are used to carry both control signaling and data for mesh or MANET, in a MANET subframe 1105. Again, either an IEEE 802.11 or 802.16 PHY could operate in the MANET subframe. All 802.16 PMP traffic would be constrained to exist within a PMP subframe 1115. IEEE 802.16 SS and MS nodes practicing PMP protocols only, need not be aware of the 802.11 infrastructure. While an 802.16 BS node would not need to interpret any 802.11 traffic, it must at least be aware of the start and end times of the MANET subframe 1105 so it may schedule PMP traffic in such a way as not to interfere with the MANET subframe 1105. Ideally, the BS node should be capable of practicing both the 802.16 and the 802.11 protocols so that it can bridge traffic between those MANET and PMP nodes that are not equipped to practice both protocols, and help control the MANET nodes practicing 802.11 protocols so that the MANET nodes do not interfere with the PMP nodes.

FIG. 12 shows a combined IEEE 802.11/802.16 frame structure which allows 802.11 and 802.16 nodes to share the same media. It assumes synchronization between the 802.11 (MANET) infrastructure and the 802.16 (PMP) infrastructure. Such synchronization may, for example, be provided by a BS node that practices both the 802.11 and the 802.16 protocols, or by having a common timing reference for the infrastructures as may be provided in a known manner using, for example, Global Positioning Satellites (GPS).

In FIG. 12, aspects of the 802.11 protocol are used to prevent 802.11 nodes from interfering with nodes that practice the 802.16 protocol. As noted previously, TBTT can be used as a nominal Start of Frame for the 802.11 infrastructure.

Such an 802.11 Frame is shown at 1200. An 802.16 Frame 1205 is offset from the start of the 802.11 Frame by enough time to allow for a fixed amount of Beacon contention 1210 and for a Beacon message 1215. The Beacon may contain the 802.11 CFP parameters such that a CFP 1220 is defined that prevents 802.11 nodes from transmitting without first being polled by an AP node. The 802.11 nodes would, however, be configured so as not to poll any stations during the CFP. This ensures that no 802.11 communications will occur during the CFP.

An 802.16 BS node may be configured so as to use a frame that is identical in length to the time between the starts of 802.11 CFP (most likely the time between two TBTT); however the 802.16 BS node controls PMP communications so that all required PMP communications are completed during what would be the 802.11 CFP. Thus, 802.16 PMP communications will not be interfered by 802.11 communications. Since the 802.16 BS node controls associated nodes so as to communicate only during the 802.11 CFP, no 802.16 communications will occur during the 802.11 CP 1225.

In FIG. 12, details of the 802.16 frame structure are simplified, but the detailed frame structures presented earlier may still be present as will be understood by persons skilled in the art. Essentially, the 802.16 PMP protocol has been substituted for the 802.11 PCF, while the 802.11 DCF functions normally. The 802.16 PMP and the 802.11 DCF coexist without interfering with one other, and the 802.11 DCF may be used to implement a MANET as is known in the art.

FIG. 16 is a schematic block diagram of apparatus that may be used to practice the present invention. Other hardware sets may also apply, and FIG. 16 is not intended to limit the scope of the invention. FIG. 16 shows three component layers; a General Purpose Process (GPP) layer 1600, a Signal Processor (SP) layer 1605, and a Radio Frequency (RF) hardware layer 1610. The GPP layer includes components typically used to construct a computer such as a CPU, Memory, and Interface logic. The Interface logic may be used to implement well known interfaces such as Ethernet. The SP layer includes components such as Digital Signal Processors (DSP), Field Programmable Gate Arrays (FPGA), Analog to Digital Converters (A/D), and Digital to Analog Converters (D/A). The RF layer comprises devices including, e.g., analog integrated circuits (IC), resistors, capacitors, and such other devices as required to convert the signal provided by the signal processor to a corresponding RF signal. A hardware set having elements that are configured to implement the required functions is, for example, a Model R3T-P-700 radio available from BAE Systems—Network Systems (NS).

FIG. 17 is a functional block diagram of a multi-protocol node that is constructed using a hardware set such as illustrated in FIG. 16, according to the invention. Data 1700 is communicated to and from the multi-protocol (communications) node from devices that require communications services. The data 1700 may, for example, be passed over an Ethernet interface. Control status information 1705 may also be provided from external inputs (possibly over the same interface as the Data) to determine network configuration parameters. This information may also be hard coded into the GPP. A Timing Reference 1710 is passed to the node of FIG. 17 via an interface into the signal processing layer SP. While timing information may also be communicated over the wireless network, or through the control interface, it is often convenient to have a dedicated hardware interface that is most easily supported at the SP layer. The timing reference can then be made available to other layers and components as, needed.

A networking component 1715 is configured for processing data to be transported by the node of FIG. 17, and is responsible for properly routing the data, for example, deciding whether or not the data needs to be routed over either a PMP link or a MANET link. The control inputs are shown as flowing into the networking component 1715. From there they are distributed to other components as required. The control inputs may also be distributed directly to the other components.

A PMP MAC component 1720 is configured in the node of FIG. 17 to implement the protocols required for PMP communications. This component may implement the protocols for a fixed subscriber node, a mobile subscriber node, or a base station node depending on the desired configuration. A MANET MAC component 1725 is provided as well. The component 1725 implements protocols required for the MANET communications. It is contemplated that the MANET and the PMP components 1725, 1720 are constructed and arranged to interface with one another so as to pass scheduling information 1730 between them. It may, however, be possible to avoid this scheduling interface by hard coding of scheduling information. In addition, a bridging component 1735 may optionally the provided between the MANET and the PMP MACs 1725, 1720. The bridging component may be used to pass data between the two protocol sets (PMP and MANET). This allows nodes using the MANET protocol sets to communicate with other nodes which might only be using the PMP protocols sets. Some systems may prefer to rely on the routing capability in the networking component 1715 to accomplish the same capability as bridging, and omit the bridging component 1735 at the expense of additional overhead and delay associated with the networking component 1715.

The Networking, the MAC, and the bridging components may be implemented in a known manner on a general-purpose processor. These components (or parts thereof) may also be implemented via firmware in the SP part of the node. Physical (PHY) layer components are normally implemented in the SP portion of a node, including modulation, error correction coding, interleaving, and any specialized processing such as antenna pattern, equalization, pre-distortion, and the like typically employed in modern architectures.

The node of FIG. 17 has two PHY components, viz., PHY1 1735 and PHY2 1740. PHY1 is associated with the MANET protocols, and PHY2 is associated with the PMP protocols, although a common PHY may be used to support both protocol sets. While a common RF component 1745 is provided to support all analog and RF processing required to create the appropriate RF signals (sometimes called "signals in space" or SIS), it may be convenient to have separate RF components and associated antennas 1750 for each protocol set (PMP and MANET). Multiple RF sections and protocols (such as for MIMO or adaptive antenna implementations) may even be necessary for some applications. Also, a PMP Base Station may support multiple sectors, each with their own MAC, PHY and RF within the same node.

FIG. 13 is a functional block diagram of a multi-protocol station or a node practicing specifically the IEEE 802.16 and 802.11 protocols. Details of the networking component are omitted. As will be apparent to those skilled in the art, there are a number of ways to implement each of the various functions. For example, separate microprocessors could be used to implement the 802.11 MAC 1300, and the 802.16 MAC 1305 functions. Separate field programmable gate arrays (FPGAs) could be used to implement the two PHYs 1310 and 1315. a common set of RF hardware 1320 could be used to upconvert/downconvert, and otherwise condition the signals produced by the two PHY modules 1310, 1315. The signals from the RF block 1320 would be passed to/from the antenna 1325. Separate sets of RF components and antennas may, however, be used for the 802.11 and 802.16 functions, and a single FPGA and micro processor used to implement both of the PHYs 1310, 1315, and the 802.11 and 802.16 MACs 1300, 1305.

If the 802.11 and 802.16 functions are collocated at a single station or node as in FIG. 13, enhanced operation is possible. In particular, if (i) the 802.16 MAC 1305 includes the 802.16 PMP BS node function, (ii) the 802.11 MAC 1300 includes an 802.11 AP node function, and (iii) both of the MACs 1300, 1305 run from a common timing reference 1330 which in the present embodiment may be distributed to the MAC components via the PHY components as shown, it is easier to ensure synchronization between the 802.11 and the 802.16 functions. In addition, a bridging (or routing) function 1335 can be provided as shown for allowing data to pass easily either way between the 802.11 and the 802.16 MAC functions. While generally useful in any station that practices both the 802.11 and the 802.16 protocols, bridging is particularly useful when located in a station or node that will operate as both an 802.11 AP node and an 802.16 BS node. This is because a station or node that practices just one of the protocols (802.11 or 802.16) will be allowed to communicate via the AP/BS nodes with a node that practices only the other protocol. Also, the 802.16 BS node can pass scheduling information 1340 to the 802.11 AP node. Recall that in 802.11, a CF-End message can be used to end the CFP when the PCF has no further data, thus allowing time allocated to the PCF to be recovered for use by the DCF. With the PMP scheduling info available, the AP node may now implement the CF-End capability (as shown in FIG. 12 at 1230) to recover time for the DCF (MANET) communications once all current 802.16 PMP communications needs have been met.

Concerning FIG. 13, it is noted as before that PHY1 1310 associated with the 802.11 MAC 1300, may be a standard 802.11 PHY, or may be an 802.16 PHY. It may be easier to implement completely standalone 802.16 and 802.11 configurations, with only timing and bridging functions being shared in common. In such a case, it may be more convenient to use an 802.11 PHY. With some additional effort, an 802.16 PHY can be paired with an 802.11 MAC, however. This has an advantage in that the two PHY (PHY1 and PHY2) may be replaced by a single PHY, but compatibility with existing 802.11 infrastructure may be lost. Other implementation options will be apparent to those skilled in the art.

It may also be advantageous to use an 802.11 MAC configured for an IBSS rather than an AP node. Recall that in an IBSS, all stations participate in the Beaconing process. For a MANET, this can be a fairly important function. The stations practicing 802.11 might not always be within range of an 802.16 PMP system, so they may want to announce their existence periodically. Transmitting a Beacon is a convenient way to do so. Also, an AP node implementing the PCF will not normally include a Beacon contention period. Rather a PIFS time would be used. This prevents other stations from sending the Beacon. So it is preferred that all of the 802.11 MAC provide for Beacon contention. The number of Beacon contention slots at the beginning of the frame could be a hard coded network parameter with, e.g., 32 being a preferred implementation. Adaptive techniques that account for the number of 802.11 stations may also be applied. An exception to the standard 802.11 IBSS Beaconing protocol is that all stations transmitting Beacons should include the CFP Parameters. This is not normally the case for Beacons in an IBSS. Because the Beacon size can vary based on the number of elements included, it may be desirable to limit the size of a Beacon message to ensure it will fit prior to the 802.16 preamble even if transmitted in the last Beacon contention slot.

Other optimizations of the 802.11 protocol are possible. For example, the Inter-Frame Space (IFS) and slot size in 802.11 are optimized for a 1000 meter maximum range. These values could be modified for more optimal operation at larger ranges. One final optimization would be that if all stations practice the modified version of 802.11 described herein, the PCF parameters may be hard coded in each station and it would not be necessary to transmit them.

It is possible further to improve existing MANET protocol sets for optimized performance in the combined PMP/MANET frame of FIG. 6. The MANET protocols set may be partitioned into a "Reservation" based protocol set, and a "Contention" based protocol set. With appropriate preplanning, it is possible to rely exclusively on the Reservation based protocol set. It is also possible to use only the Contention based protocol set which provides increased flexibility, but usually with reduced efficiency. A preferred implementation would combine the Contention based protocol set with the Reservation based protocol set, so as to allow optimum flexibility and efficiency.

A further embodiment is shown in FIG. 14, and is referred to herein as a "META-MANET" (MM) frame structure. The structure uses ML Bursts (as also shown in FIG. 8) that are scheduled in a manner similar to that used in USAP. The Bootstrap slots shown in FIG. 8 are replaced by Contention Slots 1400, however. The slots 1400 are detailed in the part of the figure termed contention slot details 1405, and are intended for passing control messages, or short data messages. The Contention Slots use OFDM modulation even if the rest of the frame uses OFDMA modulation, and operate similar to slots in the "Slotted Aloha" protocol well known in the art except that the slots 1400 have internal structure that allows them to be used for Carrier Sense Multiple Access (CSMA) which is also well known in the art and used, for example, in the 802.11 protocol. Five Contention Slots 1400 are shown as a preferred embodiment, but more or less could be used within the scope of the invention.

The contention slots 1400 are constructed so as to allow either CSMA or Slotted Aloha (or some combination of the two) to be practiced. A Turn Around Time 1410 is allocated at the beginning of the contention slot to allow nodes to change from transmit to receive, or from receive to transmit mode. One quarter of an OFDM symbol is allocated for this purpose in the preferred embodiment, but more or less may be used according to the invention. A priority opportunity (PO) 1415 is shown that allows priority messages to be given preferential access to a contention slot when CSMA is practiced. Example messages would be a Clear to Transmit (CTS) or an Acknowledgment (ACK), as described in the 802.11 protocol. Three quarters of an OFDM symbol time are allocated for the priority opportunity in the preferred embodiment, but more or less time may be allocated. There may also be multiple priority opportunities, or no priority opportunities, according to the invention.

Following the priority opportunities are a number of contention opportunities (CO) 1420. The CO 1420 may be used in the same fashion as they are used within the 802.11 protocol, though other approaches may also be used. Three CO are shown as the preferred embodiment, but more or less may be used. The CO 1420 are shown as one quarter of an OFDM symbol in size as a preferred embodiment, but larger or smaller sized CO may be used according to the invention. In the preferred embodiment, sufficient time is allocated for 3 OFDM symbols, tow synchronization (sync) symbols, and one data symbol. As would be apparent to one skilled in the art, more or fewer sync and data symbols may be allocated for a CO while remaining within the scope of the invention.

Particularly when practicing Slotted Aloha, range delay must be accounted. The Contention Slot 1400 includes an allocation for range delay 1425 which, for the preferred embodiment, is set to one and a half OFDM symbols, but more or fewer may be allocated within the scope of the invention.

In summary, the various frame structures disclosed and described herein serve to support both PMP and MANET or mesh protocol wireless communications on a shared set of channels in a common network. In all of the frame structures, a front or leading portion of the PMP frame is reserved for key PMP control fields, and an end portion of the PMP frame is reserved for MANET or mesh control traffic. A PMP base station or node using the inventive frame structure monitors the MANET/mesh scheduling, and schedules PMP traffic around the MANET/mesh traffic. In some cases a predetermined partitioning could be used. A number of mechanisms have been described for allocating capacity to the MANET/mesh data traffic in the frame structure.

While the foregoing represents preferred embodiments of the invention, it will be understood by those skilled in the art that various modifications and changes may be made without departing from the spirit and scope of the invention, and that the invention includes all such modifications and changes as come within the scope of the following claims.

We claim:

1. A multi-protocol wireless communications node, comprising:
   an interface component constructed and arranged for providing control information or data to and from the node with respect to outside devices requiring communication services;
   a networking component coupled to the interface component and configured for routing data to be transported by the node over either a link that follows a MANET or mesh protocol, or a link that follows a point-to-multipoint (PMP) protocol;
   a first medium access controller (MAC) component coupled to the networking component and configured to implement the MANET or mesh protocol;
   a second MAC component coupled to the networking component and configured to implement the PMP protocol, wherein the first and the second MAC components are arranged to interface with one another for passing scheduling information;
   a radio frequency (RF) component;
   a timing reference source;
   a first physical layer component responsive to the timing reference source and coupled to the first MAC component and the RF component, for (i) processing first data input from the first MAC component according to the MANET or mesh protocol, and outputting the processed first data to the RF component for transmission, and (ii) processing second data input from the RF component according to the MANET or mesh protocol, and outputting the processed second data to the first MAC component; and
   a second physical layer component responsive to the timing reference source and coupled to the second MAC component and to the RF component, for (i) processing third data input from the second MAC component according to the PMP protocol, and outputting the processed third data to the RF component for transmission, and (ii) processing fourth data input from the RF component according to the PMP protocol, and outputting the processed fourth data to the second MAC component.

2. A communications node according to claim 1, wherein the second MAC component is constructed and arranged to configure the node as a fixed subscriber station node in a PMP protocol network.

3. A communications node according to claim 1, wherein the second MAC component is constructed and arranged to configure the node as a mobile subscriber station node in a PMP protocol network.

4. A communications node according to claim 1, wherein the second MAC component is constructed and arranged to configure the node as a base station node in a PMP protocol network.

5. A communications node according to claim 1, including a bridging component coupled to the first and the second MAC components for exchanging data between the MAC components.

6. A communications node according to claim 1, wherein the first MAC component is configured to implement a mesh protocol according to the IEEE 802.11 Standard.

7. A communications node according to claim 1, wherein the second MAC component is configured to implement the PMP protocol according to the IEEE 802.16 Standard.

8. A communications node according to claim 1, wherein the first MAC component is configured to implement a mesh protocol according to the IEEE 802.11 standard, and the second MAC component is configured to implement the PMP protocol according to the IEEE 802.16 Standard, wherein the second MAC component is arranged to configure the node as a base station node in a PMP protocol network, the first MAC component is arranged to configure the node as an access point (AP) node in a mesh protocol network, and both of the first and the second MAC components are coupled to a common timing reference for synchronization.

9. A communications node according to claim 8, including a bridging component coupled to the first and the second MAC components for exchanging data between the MAC components.

10. A communications node according to claim 1, wherein the first MAC component is configured to implement a MANET protocol having a frame format that is structured to operate with both Slotted Aloha and CSMA contention protocols.

11. A communications network comprised of a number of nodes including one or more multi-protocol nodes according to claim 1, and one or more schedulers associated with the multi-protocol nodes for reserving time for PMP and MANET/mesh communications among the nodes over a common set of network channels or subchannels.

* * * * *